United States Patent
Ke

(10) Patent No.: US 12,445,941 B2
(45) Date of Patent: Oct. 14, 2025

(54) PROCESSING METHOD, TERMINAL, AND NETWORK ELEMENT

(71) Applicant: VIVO MOBILE COMMUNICATION CO., LTD., Guangdong (CN)

(72) Inventor: Xiaowan Ke, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 919 days.

(21) Appl. No.: 17/131,593

(22) Filed: Dec. 22, 2020

(65) Prior Publication Data

US 2021/0112483 A1  Apr. 15, 2021

Related U.S. Application Data

(63) Continuation of application No. PCT/CN2019/092272, filed on Jun. 21, 2019.

(30) Foreign Application Priority Data

Jun. 22, 2018 (CN) .......................... 201810655001.8

(51) Int. Cl.
| | |
|---|---|
| H04W 48/14 | (2009.01) |
| H04W 8/12 | (2009.01) |
| H04W 8/24 | (2009.01) |
| H04W 48/04 | (2009.01) |
| H04W 48/08 | (2009.01) |
| H04W 48/16 | (2009.01) |
| H04W 48/20 | (2009.01) |
| H04W 76/11 | (2018.01) |

(Continued)

(52) U.S. Cl.
CPC .............. *H04W 48/14* (2013.01); *H04W 8/12* (2013.01); *H04W 8/24* (2013.01); *H04W 48/04* (2013.01); *H04W 48/08* (2013.01); *H04W 48/16* (2013.01); *H04W 48/20* (2013.01); *H04W 76/11* (2018.02); *H04W 76/30* (2018.02); *H04W 84/042* (2013.01)

(58) Field of Classification Search
CPC ........ H04W 76/30; H04W 48/14; H04W 8/12
USPC ....................................................... 370/329
See application file for complete search history.

(56) References Cited

U.S. PATENT DOCUMENTS

| | | |
|---|---|---|
| 2005/0176413 A1 | 8/2005 | Lee |
| 2008/0267153 A1 | 10/2008 | Mukherjee et al. |

(Continued)

FOREIGN PATENT DOCUMENTS

| | | |
|---|---|---|
| CN | 101312593 A | 11/2008 |
| CN | 101861754 A | 10/2010 |

(Continued)

OTHER PUBLICATIONS

European Search Report dated May 14, 2021 as received in application No. 21155471.2.

(Continued)

*Primary Examiner* — Chuck Huynh
(74) *Attorney, Agent, or Firm* — Price Heneveld LLP

(57) ABSTRACT

A processing method, a terminal and a network element are provided, and the method includes: obtaining first information, where the first information includes at least one of the following: information of a private communications service, mobility control information, and routing information of an upper-layer application; and determining a network access operation based on the first information.

10 Claims, 17 Drawing Sheets

(51) Int. Cl.
*H04W 76/30* (2018.01)
*H04W 84/04* (2009.01)

(56) References Cited

U.S. PATENT DOCUMENTS

| | | | |
|---|---|---|---|
| 2011/0269460 A1 | 11/2011 | Dalsgaard | |
| 2012/0147834 A1 | 6/2012 | Zisimopoulos et al. | |
| 2013/0065585 A1 | 3/2013 | Pelletier et al. | |
| 2013/0318572 A1* | 11/2013 | Singh | H04L 63/10 |
| | | | 726/4 |
| 2014/0169286 A1 | 6/2014 | Xu et al. | |
| 2015/0282042 A1 | 10/2015 | Griot et al. | |
| 2016/0006606 A1 | 1/2016 | Zhu | |
| 2017/0223620 A1 | 8/2017 | Liu | |
| 2017/0332421 A1 | 11/2017 | Sternberg et al. | |
| 2018/0014340 A1* | 1/2018 | Hill | H04L 12/4633 |
| 2018/0262978 A1 | 9/2018 | Kahn et al. | |
| 2019/0007899 A1 | 1/2019 | Vrzic et al. | |
| 2019/0261264 A1 | 8/2019 | Lou | |
| 2019/0268840 A1 | 8/2019 | Chen | |

FOREIGN PATENT DOCUMENTS

| | | |
|---|---|---|
| CN | 101998485 A | 3/2011 |
| CN | 102098613 A | 6/2011 |
| CN | 103166960 A | 6/2013 |
| CN | 103220669 A | 7/2013 |
| CN | 104255046 A | 12/2014 |
| CN | 104853413 A | 8/2015 |
| CN | 108024314 A | 5/2018 |
| JP | 2010525752 A | 7/2010 |
| JP | 2015507854 A | 3/2015 |
| JP | 2016507930 A | 3/2016 |
| JP | 2018513659 A | 5/2018 |
| JP | 2019515581 A | 6/2019 |
| JP | 2019536361 A | 12/2019 |
| WO | 0141478 A1 | 6/2001 |
| WO | 2014006350 A1 | 1/2014 |
| WO | 2015170223 A1 | 11/2015 |
| WO | 2017197273 A | 5/2017 |
| WO | 2018032909 A1 | 2/2018 |
| WO | 2018090172 A1 | 5/2018 |

OTHER PUBLICATIONS

Japanese Office Action dated Apr. 12, 2022 as received in application No. 2021-027671.
Japanese Office Action dated Feb. 22, 2022 as received in application No. 2020-571653.
European Search Report dated Oct. 21, 2021 as received in application No. 19823385.0.
"Study on Communication for Automation in Vertical Domains" 3GPP TR 22.804. May 2018. 3rd Generation Partnership Project.
"FS_CAV—section 8.2.1—network service access requirements" 3GPP TSG-SA WG1 Meeting #82. S1-181444. Dubrovnik, Croatia. May 7, 2018. Siemens, Nokia, Huawei, Qualcomm. Ericsson.
Chinese Office Action dated Oct. 25, 2021 as received in application No. 202010670425.9.
Written Opinion and International Search Report dated Dec. 22, 2020 as received in application No. PCT/CN2019/092272.
Chinese Office Action dated Mar. 11, 2021 as received in application No. 201810655001.8.
Chinese Office Action dated May 25, 2021 as received in application No. 202010670425.9.
Chinese Office Action dated Oct. 13, 2020 as received in application No. 201810655001.8.
"Way forward" 3GPP TSG-SA WG1 Meeting #82 S1-181650, Dubronvnik, Croatia, May 7-11, 2018. Qualcomm.
Ericsson., "Feasibility to support a deployment independent solution," 3GPP TSG-SA WG2 Meeting #132, S2-1903383, pp. 1-10, (Apr. 8-12, 2019).
EP Office Action dated Jan. 27, 2023 as received in Application No. 21155471.2.
EP Office Action dated Mar. 20, 2023 as received in Application No. 21155470.4.

* cited by examiner

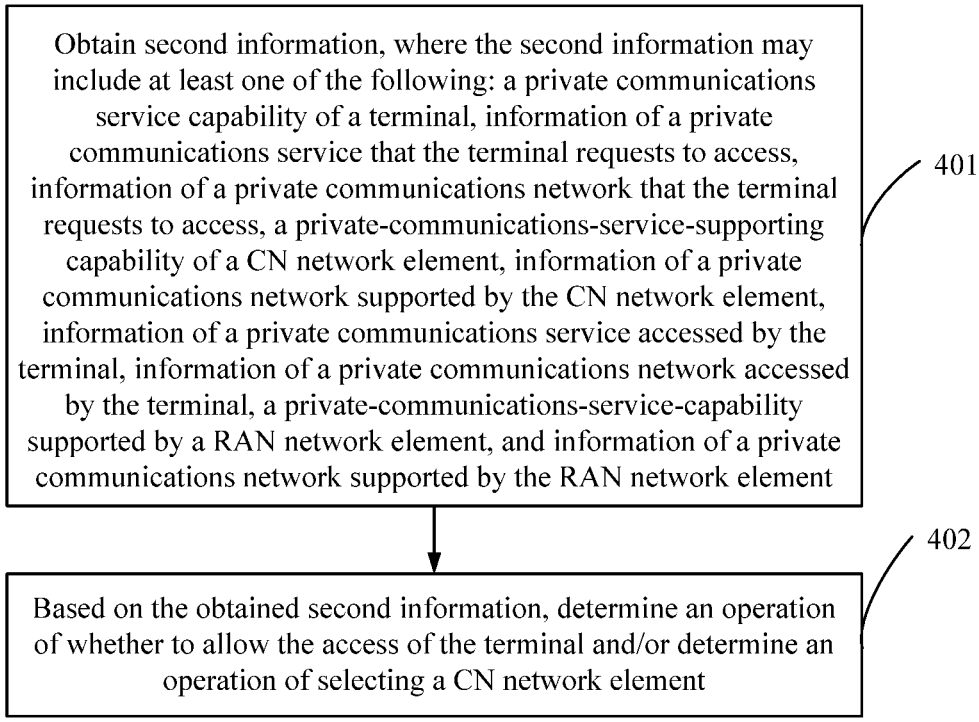

PROCESSING METHOD, TERMINAL, AND NETWORK ELEMENT

CROSS-REFERENCE TO RELATED APPLICATIONS

This application is a continuation application of International Application No. PCT/CN2019/092272 filed on Jun. 21, 2019, which claims priority to Chinese Patent Application No. 201810655001.8 filed in China on Jun. 22, 2018, which is incorporated herein by reference in its entirety.

TECHNICAL FIELD

Embodiments of this disclosure relate to the field of communications technologies, and in particular, to a processing method, a terminal, and a network element.

BACKGROUND

In related technologies, many vertical industries such as railway dispatching and automation control have communication requirements. A communications network using the fifth generation (5th-Generation, 5G) mobile communications technology is able to provide the vertical industries with a local area network (Local Area Network, LAN)-type private communications service to meet the communication requirements of the vertical industries. The LAN-type service may refer to an IP-type or non-IP-type private communications service provided on a 3rd generation partnership project (3rd Generation Partnership Project, 3GPP) network system.

A private virtual network (Private Virtual Network, PVN) can be a private virtual network that supports a LAN-type service. The PVN and the LAN may be mixed in concept, and may generally refer to a private communications network or a private communications service.

The private communications network may be categorized into a type-A network and a type-B network. The type-A network may be a communications network not used for public (such as a 3GPP network), but the network supports service continuity or roaming with an operator network. The type-B network may be an isolated communications network (such as a 3GPP network) that does not interact with an operator network such as a public land mobile network (Public Land Mobile Network, PLMN).

As a transmission network for the private communications network of the vertical industry, the private communications network is able to support a service in the private communications network for terminals of the private communications network or realize communication between terminals in the private communications network.

When a private communications network is provided for a vertical service through an operator network, terminals of the vertical service can access the private communications network to communicate with each other or access a server of the vertical service. The terminals in the vertical industry may also access the operator's public communications network to perform public communications services. However, in related technologies, it is not clear how the terminal accesses a private communications network and a public communications network separately.

SUMMARY

According to a first aspect, an embodiment of this disclosure provides a processing method applied to a terminal, where the method includes:

obtaining first information, where the first information includes at least one of the following: information of a private communications service, mobility control information, and routing information of an upper-layer application; and determining a network access operation based on the first information.

According to a second aspect, an embodiment of this disclosure provides a processing method applied to a first network element, where the method includes:

sending, to a first target end, at least one of information of a private communications network supported by the first network element, a private-communications-service-capability supported by the first network element, and redirection information of the private communications network.

According to a third aspect, an embodiment of this disclosure provides a processing method applied to a second network element, where the method includes:

obtaining second information, where the second information includes at least one of the following: a private communications service capability of a terminal, information of a private communications service that the terminal requests to access, information of a private communications network that the terminal requests to access, a private-communications-service-capability supported by a CN network element, information of a private communications network supported by the CN network element, information of a private communications service accessed by the terminal, information of a private communications network accessed by the terminal, a private-communications-service-capability supported by a RAN network element, and information of a private communications network supported by the RAN network element; and based on the obtained second information, determining an operation of whether to allow the access of the terminal and/or determining an operation of selecting a CN network element.

According to a fourth aspect, an embodiment of this disclosure provides a processing method applied to a third network element, where the method includes:

obtaining third information, where the third information includes at least one of the following: a private communications service capability of a terminal, information of a private communications service requested by the terminal, information of a private communications network that the terminal requests to access, private communications service subscription information of the terminal, a private-communications-service-capability supported by a RAN network element, information of a private communications network supported by the RAN network element, a private-communications-service-capability supported by a CN network element, and information of a private communications network supported by the CN network element; and determining first information based on the obtained third information, where the first information includes at least one of the following: information of the private communications service, mobility control information, and routing information of an upper-layer application.

According to a fifth aspect, an embodiment of this disclosure provides a processing method applied to a terminal, where the method includes:

obtaining fourth information, where the fourth information includes at least one of the following: mobility control information, information of a private communications service accessed by a terminal, information of a first private communications network accessed by the terminal, a private-communications-service-capability supported by a network element, and information of a private communications network supported by the network element; and determining a network mobility operation based on the fourth information.

According to a sixth aspect, an embodiment of this disclosure provides a processing method applied to a fourth network element, where the method includes:

obtaining fourth information, where the fourth information includes information of a private communications service accessed by a terminal, information of a first private communications network accessed by the terminal, mobility control information, a private-communications-service-capability supported by a sixth network element, and information of a private communications network supported by the sixth network element; and determining a network mobility operation of the terminal based on the fourth information.

According to a seventh aspect, an embodiment of this disclosure provides a processing method applied to a fifth network element, including:

obtaining fifth information, where the fifth information includes at least one of the following: a private communications network that a terminal requests to access, a private communications service capability of the terminal, private communications service subscription information of the terminal, a private-communications-service-capability supported by a RAN network element, information of a private communications network supported by the RAN network element, a private-communications-service-capability supported by a CN network element, and information of a private communications network supported by the CN network element; and determining fourth information based on the obtained fifth information, where the fourth information includes at least one of the following: mobility control information, information of a private communications service accessed by the terminal, information of a first private communications network accessed by the terminal, a private-communications-service-capability supported by a sixth network element, and information of a private communications network supported by the sixth network element.

According to an eighth aspect, an embodiment of this disclosure provides a terminal, including:

a first obtaining module, configured to obtain first information, where the first information includes at least one of the following: information of a private communications service, mobility control information, and routing information of an upper-layer application; and a first determining module, configured to determine a network access operation based on the first information.

According to a ninth aspect, an embodiment of this disclosure provides a first network element, including:

a first transmission module, configured to send, to a first target end, at least one of information of a private communications network supported by the first network element, a private-communications-service-capability supported by the first network element, and redirection information of the private communications network, where the first target end includes at least one of a terminal and a core network CN network element.

According to a tenth aspect, an embodiment of this disclosure provides a second network element, including:

a second obtaining module, configured to obtain second information, where the second information includes at least one of the following: a private communications service capability of a terminal, information of a private communications service that the terminal requests to access, information of a private communications network that the terminal requests to access, a private-communications-service-capability supported by a CN network element, information of a private communications network supported by the CN network element, information of a private communications service accessed by the terminal, information of a private communications network accessed by the terminal, a private-communications-service-capability supported by a RAN network element, and information of a private communications network supported by the RAN network element; and a second determining module, configured to: based on the obtained second information, determine an operation of whether to allow the access of the terminal and/or determining an operation of selecting a CN network element.

According to an eleventh aspect, an embodiment of this disclosure provides a third network element, including:

a third obtaining module, configured to obtain third information, where the third information includes at least one of the following: a private communications service capability of a terminal, information of a private communications service requested by the terminal, information of a private communications network that the terminal requests to access, private communications service subscription information of the terminal, a private-communications-service-capability supported by a RAN network element, information of a private communications network supported by the RAN network element, a private-communications-service-capability supported by a CN network element, and information of a private communications network supported by the CN network element; and a third determining module, configured to determine first information based on the obtained third information, where the first information includes at least one of the following: information of the private communications service, mobility control information, and routing information of an upper-layer application.

According to a twelfth aspect, an embodiment of this disclosure provides a terminal, including:

a fourth obtaining module, configured to obtain fourth information, where the fourth information includes: mobility control information, information of a private communications service accessed by the terminal, information of a first private communications network accessed by the terminal, a private-communications-service-capability supported by a network element, and information of a private communications network supported by the network element; and a fourth determining module, configured to determine a network mobility operation based on the fourth information.

According to a thirteenth aspect, an embodiment of this disclosure provides a fourth network element, including:

a fifth obtaining module, configured to obtain fourth information, where the fourth information includes information of a private communications service accessed by a terminal, information of a first private communications network accessed by the terminal, mobility control information, a private-communications-service-capability supported by a sixth network element, and information of a private communications network supported by the sixth network element; and a fifth determining module, configured to determine a network mobility operation of the terminal based on the fourth information.

According to a fourteenth aspect, an embodiment of this disclosure provides a fifth network element, including:

a sixth obtaining module, configured to obtain fifth information, where the fifth information includes at least one of the following: a private communications network that a terminal requests to access, a private communications service capability of the terminal, private communications service subscription information of the terminal, a private-communications-service-capability supported by a RAN network element, information of a private communications network supported by the RAN network element, a private-communications-service-capability supported by a CN network element, and information of a private communications network supported by the CN network element; and a sixth determining module, configured to determine fourth information based on the obtained fifth information, where the fourth information includes at least one of the following: mobility control information, information of a private communications service accessed by the terminal, information of a first private communications network accessed by the terminal, a private-communications-service-capability supported by a sixth network element, and information of a private communications network supported by the sixth network element.

According to a fifteenth aspect, an embodiment of this disclosure further provides a terminal, where the terminal includes a processor, a memory, and a computer program stored in the memory and capable of running on the processor. When the computer program is executed by the processor, the steps of the processing method according to the first aspect or the fifth aspect are implemented.

According to a sixteenth aspect, an embodiment of this disclosure further provides a network element, where the network element includes a processor, a memory, and a computer program stored in the memory and capable of running on the processor. When the computer program is executed by the processor, the steps of the processing method according to the second aspect, the third aspect, the fourth aspect, the sixth aspect, or the seventh aspect are implemented.

According to a seventeenth aspect, an embodiment of this disclosure further provides a computer-readable storage medium, where a computer program is stored in the computer-readable storage medium. When the computer program is executed by a processor, the steps of the processing method according to the first aspect, the second aspect, the third aspect, the fourth aspect, the fifth aspect, the sixth aspect, or the seventh aspect are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

FIG. 3 is a flowchart 2 of a processing method according to an embodiment of this disclosure;

FIG. 4 is a flowchart 3 of a processing method according to an embodiment of this disclosure;

DESCRIPTION OF EMBODIMENTS

Figure 1A:
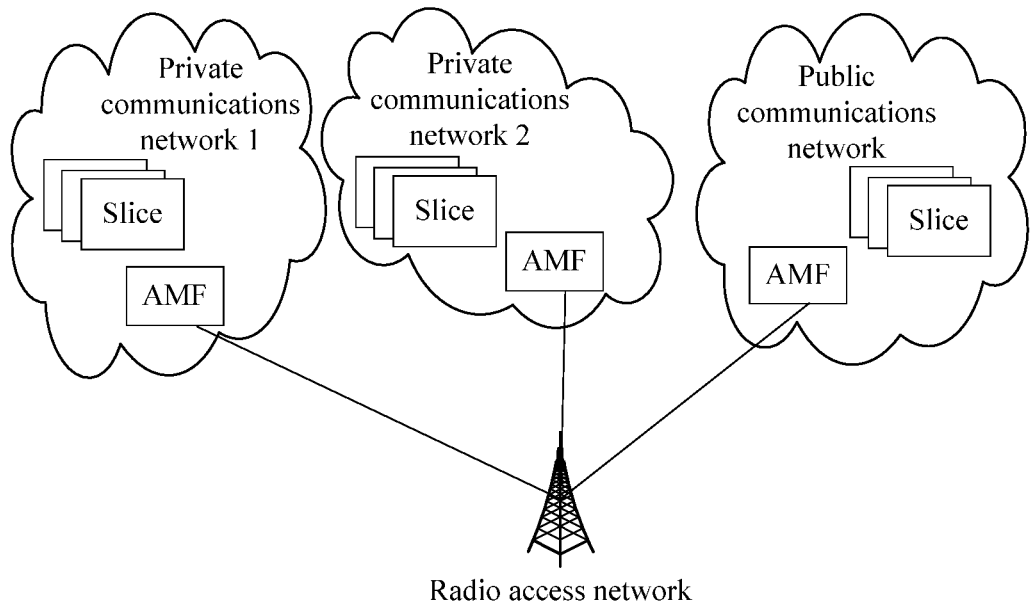
FIG. 1a is a schematic diagram 1 of an overall architecture according to an embodiment of this disclosure.

First, it should be noted that the following problems can be resolved in the embodiments of this disclosure:

(1) Identification

An operator network is identified by a public land mobile network ID (Public Land Mobile Network ID, PLMN ID). A quantity of PLMN IDs is limited. One operator network may have a plurality of private communications networks (PVN) that support a plurality of vertical services, and one vertical service may span a plurality of operator networks. Therefore, the PLMN ID cannot be used as an identity of the private communications network. A private communications network of one vertical service may contain a plurality of network slices, and a related identity of the network slice cannot be used as the identity of the private communications network. Therefore, it is still unclear how to identify a private communications network of a vertical service for the operator.

(2) Network Type Permission for an Upper-Layer Application

When a private communications network is provided for a vertical service through the operator network, terminals of the vertical service can access the private communications network to communicate with each other or access a server of the vertical service. The terminals in the vertical industry may also access the operator's public communications network to perform public communications services. In related technologies, the terminal has no information to restrict which upper-layer applications to accessing the private communications network and which applications to accessing the public communications network.

Terminals of a type-B network can access only the private communications network, and terminals of a type-A network can access both the private communications networks and the public communications network.

(3) Mobility and Roaming Range Permission

A serving range of the private communications network may be a limited area, rather than the entire network. Terminals of a vertical service are still not clear which network areas support the private communications network of the vertical service, that is, where to access the private communications network. The operator network may be divided into a plurality of private virtual networks to support private communications services. It is still not clear how to select a network element in the private communications network for the terminal.

For the type-B network, there is only a mobility range of the private communications network. For the type-A network, there are both the mobility range of the private communications network and a mobility range for roaming, indicating whether allowed to roam to the public communications network.

In addition, for the type-A network, whether allowed to access to the public communications network needs to be informed during registration with the private communications network, and whether allowed to access to the private communications network needs to be informed during registration with the public communications network.

(4) Overall Architecture

If a current cell supports both the private communications network and the public communications network, it is not clear which communications network to be preferentially registered with, and it is neither clear how a network element of a radio access network (Radio access network, RAN) selects an access mobility management function (Access Management Function, AMF).

UE sends a radio resource control (Radio Resource Control, RRC) request to the RAN to request for an indication of a private communications network ID. The network also needs to determine a registration type with reference to whether the RAN supports the private communications network ID.

Figure 1B:
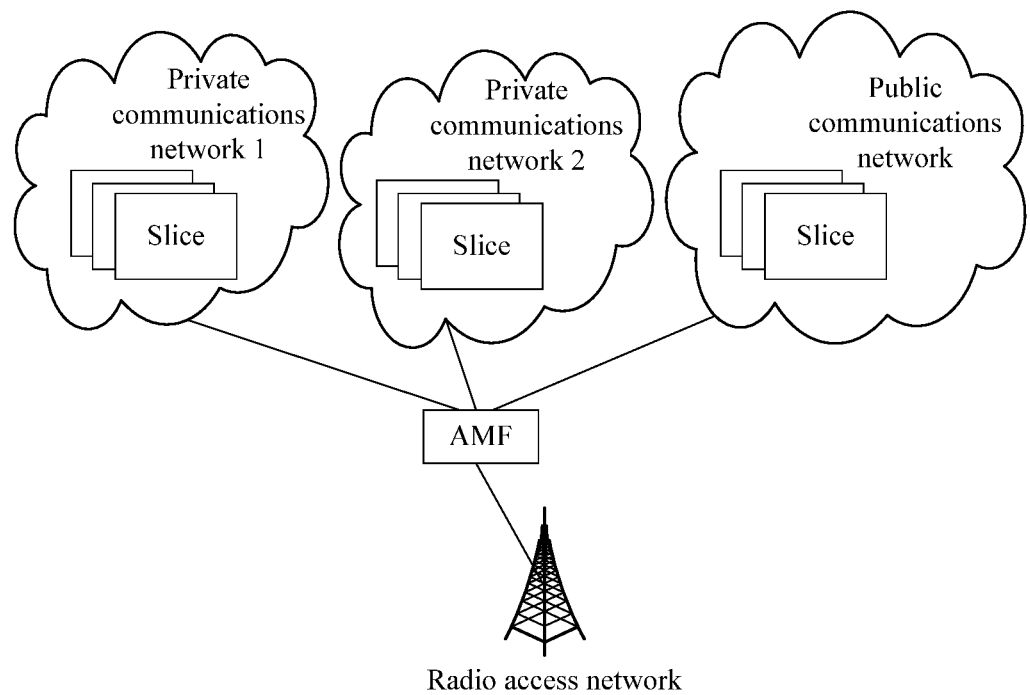
FIG. 1b is a schematic diagram 2 of an overall architecture according to an embodiment of this disclosure.
Figure 1C:
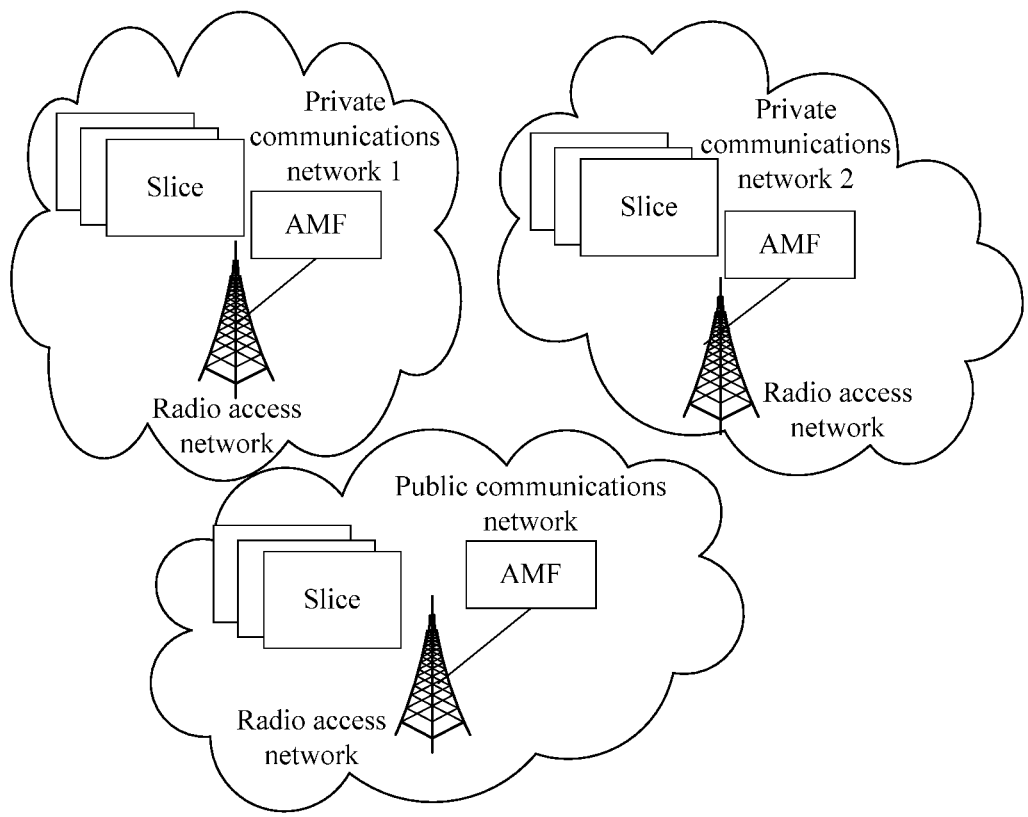
FIG. 1c is a schematic diagram 3 of an overall architecture according to an embodiment of this disclosure.

The embodiments of this disclosure propose the following several types of overall architectures. For schematic diagrams of the overall architectures, refer to FIG. 1a to FIG. 1c. It should be noted that slices shown in FIG. 1a to FIG. 1c represent network slices.

Overall architecture 1: As shown in FIG. 1a, a radio access network is shared by private communications networks and a public communications network. AMFs and slices are unique to the private communications networks and the public communications network, that is, the private communications networks and the public communications network each have a dedicated AMF.

Overall architecture 2: As shown in FIG. 1b, a radio access network and an AMF are shared by private communications networks and a public communications network. Slices are unique to the private communications networks and the public communications network.

Overall architecture 3: As shown in FIG. 1c, radio access networks, AMFs, and slices are all unique to private communications networks and a public communications network.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the terms such as "first" and "second" are intended to distinguish between similar objects but do not necessarily indicate a specific order or sequence. It should be understood that the data termed in such a manner are interchangeable in proper cases so that the embodiments of this application can be implemented in other orders than the order illustrated or described in this application. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. In addition, in the specification and claims, the use of "and/or" represents presence of at least one of the connected objects, for example, "A and/or B and/or C" indicates that the following seven cases: only A, only B, only C, both A and B, both B and C, both A and C, or all A, B, and C.

In addition, in the embodiments of this disclosure, information with a same name indicates that the information may include the same content. For example, first information in the embodiments of this disclosure may include the same content.

In the embodiments of this disclosure, a core network element (or referred to as a CN element) may include but is not limited to at least one of the following: a core network device, a core network node, a core network function, a mobility management entity (Mobility Management Entity, MME), an access mobility management function (Access Management Function, AMF), a session management function (Session Management Function, SMF), a user plane function (User Plane Function, UPF), a serving gateway (serving Gate Way, SGW), a PDN gateway (PDN Gate Way), a policy control function (Policy Control Function, PCF), a policy and charging rules function unit (Policy and Charging Rules Function, PCRF), a GPRS service support node (Serving GPRS Support Node, SGSN), and a gateway GPRS support node (Gateway GPRS Support Node, GGSN).

A radio access network network element (or referred to as a RAN network element) may include but is not limited to at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved Node B (evolved Node B, eNB), a 5G base station (gNB), a radio network controller (Radio Network Controller, RNC), a base station (NodeB), a non-3GPP interworking function (Non-3GPP InterWorking Function, N3IWF), an access controller (Access Controller, AC) node, an access point (Access Point, AP) device, or a wireless local area network (Wireless Local Area Networks, WLAN) node.

A base station may be a base transceiver station (Base Transceiver Station, BTS) in GSM or CDMA, or may be a NodeB (NodeB) in WCDMA, or may be an evolved NodeB (eNB or e-Node B, evolved Node B) in LTE or a 5G NodeB (gNB), which is not limited in the embodiments of this disclosure.

It should be understood that in the embodiments of this disclosure, the radio access network network element and the core network network element may be collectively referred to as network elements. A first network element, a second network element, a third network element, a fourth network element, a fifth network element, and a sixth network element may be the same network element or different network elements, which may be specifically determined based on actual requirements, which is not limited in the embodiments of this disclosure.

In the embodiments of this disclosure, a non-public communications network may include or may be referred to as a private communications network. The non-public communications network may also be referred to as a private virtual network (Private Virtual Network, PVN), an isolated communications network, a dedicated communications network, a local area network (Local area network), or another name It should be noted that a naming manner is not specifically limited in the embodiments of this disclosure.

In the embodiments of this disclosure, application information may also be referred to as a traffic descriptor (Traffic Descriptor) or traffic description information (Traffic Description).

In the embodiments of this disclosure, access may be understood as a plurality of access modes such as roaming, handover, and redirection. For example, that a terminal accesses a second network may include one of the following: the terminal is handed over to the second network, the terminal is redirected to the second network, and the terminal roams to the second network. For example, that an application accesses the second network may include one of the following: a PDU session for the application is established in the second network, a PDU session for the application is activated in the second network, and a PDU session for the application is switched to the second network.

The following describes the processing method in the embodiments of this disclosure.

Figure 2:
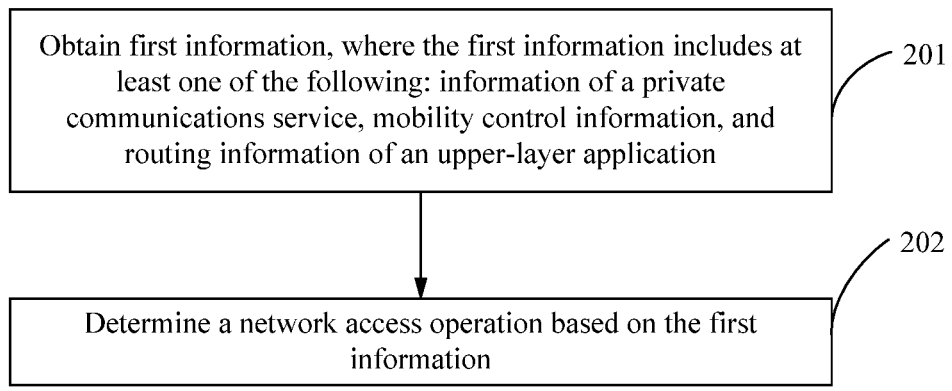
FIG. 2 is a flowchart 1 of a processing method according to an embodiment of this disclosure.

Referring to FIG. 2, FIG. 2 is a flowchart 1 of a processing method according to an embodiment of this disclosure. The processing method of this embodiment is applied to a terminal. As shown in FIG. 2, the processing method in this embodiment may include the following steps.

Step 201: Obtain first information, where the first information includes at least one of the following: information of a private communications service, mobility control information, and routing information of an upper-layer application.

In this embodiment of this disclosure, obtaining may be understood as obtaining from configuration, obtaining through receiving, obtaining through receiving upon a request, or obtaining by means of processing received information, which may be specifically determined based on an actual requirement. This is not limited in this embodiment of this disclosure.

In practical application, the information of the private communications service in the first information can be embodied as a policy related to the private communications service. In one implementation, a terminal supporting a private communications network obtains the policy of the private communications service from the configuration. After the terminal registers with the private communications network, the private communications network may update the policy related to the private communications service on the terminal, such as a UE route selection policy (UE Route Selection Policy, URSP).

Further, the terminal may be at least one of the following: a terminal of the private communications service and a terminal of a first private communications network.

Further, the upper-layer application may be at least one of the following: an upper-layer application of the private communications service and an upper-layer application of the first private communications network.

The first private communications network may be a home network of the terminal.

Optionally, the information of the private communications service may include at least one of the following: indication information of the private communications service, information of an operator network that supports the private communications network, information of the private communications network, information about an allowed area range for the private communications service, information about a prohibited area range for the private communications service, application information of an upper-layer application that allows the private communications service, and application information of an upper-layer application that prohibits the private communications service.

Further, the indication information of the private communications service may include information indicating whether the private communications service is allowed.

Further, the information of an operator network may include at least an identity of an operator network (such as a PLMN identity).

Further, the information of the private communications network may include at least one of the following: a PLMN identity, an identity of the private communications network, and a type of the private communications network. The identity of the private communications network may be an identity of a private communications network that supports the private communications service and corresponds to a PLMN.

The private communications network in the information of the private communications network may include at least one of the following: a configured private communications network, an access-allowing private communications network, and an access-prohibiting private communications network. In one implementation, the terminal selects a requested-to-access private communications network from the configured private communications network and/or the access-allowing private communications network, and sends information of the requested-to-access private communications network to a network. The network may return, to the terminal, information of the access-allowing private communications network and/or information of the access-prohibiting private communications network. In one implementation, the access-allowing private communications network may include at least one of the following: a home private communications network and a roaming-allowing private communications network.

Further, the identity of the private communications network may include a network slice differentiator (Slice Differentiator, SD) and a PLMN identity.

Further, the type of the private communications network may include at least one of the following: type A and type B.

Further, the area range information may correspond to (or be embodied as) at least one of the following: a registration area (Registration Area, RA) list, a tracking area (Tracking Area, TA) list, a radio access network RAN network element list, and a cell list.

The allowed area range for the private communications service may include at least one of the following: an area range of the first private communications network, an area range of an access-allowing second private communications network, an area range of an access-allowing public communications network, an area range of a public communications network in which the private communications service is allowed to initiate, an area range of a second private communications network in which a private communications service of the first private communications network is allowed to initiate, and a public communications network in which a private communications service of the first private communications network is allowed to initiate.

In one implementation, the private communications network service of the first private communications network may mean that a network (the public communications network or the second private communications network) being accessed by the terminal is connected to the first private communications network in a manner of home routed roaming access. It is easy to understand that a private DN can be accessed via the first private communications network which connects to the private DN.

It is easy to understand that the private communications network may be a private virtual network in the operator network. A same private communications network may have different identities in different operator networks.

In one implementation, the identity of the private communications network may be the identity of the private communications network in different operator networks, that is, the identity of the private communications network is different in different operator networks. In another implementation, the identity of the private communications network is globally unique, and one private communications network has the same identifier in different operator networks.

Further, the mobility control information may include at least one of the following:

whether access to a second network is allowed, network information of a second network allowed to be accessed, network information of a second network prohibited to be accessed, information of a private communications service's application allowed to access a public communications network, and information of a first private communications networks application allowed to access the second network.

The second network includes at least one of the following: a second private communications network and a public communications network.

In the embodiments of this disclosure, access may be understood as a plurality of access modes such as roaming, handover, and redirection. For example, that the terminal accesses the second network may include one of the following: the terminal is handed over to the second network, the terminal is redirected to the second network, and the terminal roams to the second network.

Optionally, the network information may include one or more of the following: communications network type information, a communications network identity, slice information, and area range information.

Further, the communications network type information may include one or more of the following: a private communications network, a public communications network, a type-A private communications network, and a type-B private communications network.

The communications network identity may be the identity of the private communications network or the identity of the public communications network.

The slice information may include at least one of the following: network slice selection assistance information (network slice selection assistance information, NSSAI), an S-NSSAI, and an NSI ID (Network Slice Instance Identity, network slice instance identity).

In one implementation, slice information of the private communications network may include one or more of the following: slice information of the access-allowing private communications network, slice information of the access-prohibiting private communications network, slice information of the configured private communications network, and slice information of a subscribed private communications network.

Further, the application information may include at least one of the following: an application identity, an IP 3-tuple, an IP 5-tuple, a destination IP address, a destination IPv6 prefix, a source IP address, a source IPv6 prefix, a source port number, a destination port number, a protocol identity, a source media access control (Media Access Control, MAC) address, a destination MAC address, and an Ethernet identity.

The application information of the private communications service indicates an upper-layer application capable of using the private communications network or the private communications service on the terminal.

It should be understood that both upper-layer application information of an allowed private communications service and upper-layer application information of a prohibited private communications service may include at least one of the foregoing application information. In addition, content included in the upper-layer application information of the allowed private communications service and that included in the upper-layer application information of the prohibited private communications service may be the same or different, and may be specifically determined based on an actual requirement, which is not limited in this embodiment of this disclosure.

Further, the information of the private communications network may include at least one of the following:

the identity of the private communications network, the type of the private communications network, a serving area range of the private communications network, information of an operator network that supports the private communications network, application information of an upper-layer application allowed to access the private communications network, and application information of an upper-layer application prohibited to access the private communications network.

In one implementation, the private communications network in the information of the private communications network may include at least one of the following: the first private communications network and the access-allowing second private communications network.

Optionally, the routing information of the upper-layer application may include at least one of the following: application information and route description information.

Further, the route description information includes at least one of the following:

network slice information of the private communications service (for example, an NSSAI, an S-NSSAI, or an NSI ID);

a data network name (Data Network Name, DNN) of the private communications service;

a session and service continuity (Session and Service Continuity, SSC) mode of the private communications service;

a packet data network (Packet Data Network, PDN) type of the private communications service;

a type of a communications network for priority access and a type of a communications network allowed to be accessed;

a type of a communications network prohibited to be accessed;

network information of a communications network prioritized to be accessed and network information of a communications network allowed to be accessed;

network information of a communications network prohibited to be accessed;

a type of a communications service prioritized to be accessed and a type of an allowed communications service; and a type of a prohibited communications service.

Further, the communications network type may include at least one of the following: a private communications network and a public communications network.

Further, the communications service type may include at least one of the following: a private communications service and a public communications service.

Step 202: Determine a network access operation based on the first information.

Further, the determining a network access operation may include at least one of the following: determining a type of a communications network to access, selecting a communications network to access, and determining a manner of accessing a first network; where the first network is a network that supports the private communications service.

Further, the determining a type of a communications network to access may include: determining, based on an allowed communications network type for the upper-layer application, to access a private communications network or to access a public communications network.

Further, the determining a manner of accessing a first network may include: sending, to the first network, at least one of a private-communications-service-capability supported by the terminal and information of a private communications network that the terminal requests to access. For details about the information of the private communications network, refer to the description in step 201. Details are not described herein again.

Further, the selecting a communications network to access may include: selecting a communications network to access based on a private communications network supported by a network. For example, if an allowed communication type for the upper-layer application is a private communications network and the current cell supports the private communications network, the terminal can access the cell.

Optionally, the determining a network access operation based on the first information may include:

selecting the first network based on the first information, where the first network is a network that supports the private communications service.

sending, to the first network, at least one of the private-communications-service-capability supported by the terminal and the information of the private communications network that the terminal requests to access.

In one implementation, the terminal initiates a registration request to the first network, where the registration request includes the first information. In the overall architecture shown in FIG. 1b, an AMF can select a private communications network for the terminal when the AMF is a device shared between the private communications networks and the public communications network.

In another implementation, the terminal initiates an RRC message to a radio access network of the first network, where the RRC message includes the first information. In the overall architecture shown in FIG. 1a, when an AMF of the private communications network and an AMF of the public communications network are independent devices and the terminal requests access to the private communications network, a radio access network node may select the AMF of the private communications network for the terminal.

It should be noted that various optional implementations described in this embodiment may be implemented in combination or may be implemented independently, which is not limited in the embodiments of this disclosure.

The processing method in this embodiment has at least the following beneficial effects:

For the information of the operator network that supports the private communications network, it is easy to understand that a private communications network of one vertical service may be deployed in networks of a plurality of operators. For a user V of a private communications network P, the private communications network is deployed in an operator A and an operator B. The user V is a card-issued user of the operator A. In a case of roaming, the user V may be supported to access a private communications network of the operator B. Therefore, the information of the operator network that supports the private communications network can also be roaming network information related to the private communications network. Because the terminal may support both access to the private communications network and access to the public communications network, the roaming network information related to the private communications network may be different from roaming network information of the public communications network.

It is easy to understand that the terminal may support both access to the private communications network and access to the public communications network. The private communications network may share a radio access network with the public communications network. In one implementation, based on the area range information of the private communications network, the terminal knows in which areas the private communications network is provided. When moving to these areas supporting the private communications network, the terminal may initiate the private communications service. In another implementation, the terminal performs comparison between an identity of the private communications network broadcast by a cell supporting the private communications network and an identity of the private communications network obtained from the first information, to know whether the cell supports the configured private communications network and whether the private communications service can be initiated.

For information of an application allowed to access the private communications network (or referred to being allowed to use the private communications service) and information of an application prohibited to access the private communications network (or referred to as being prohibited to use the private communications service), it is easy to understand that the terminal may support access to both the private communications network and the public communications network. Some applications on the terminal are allowed to run only on the private communications network while some applications on the terminal are allowed to run only on the public communications network. Configuring the information of the application allowed to access the private communications network can help the terminal to determine, when the application generates data, whether to trigger access to the private communications network or to trigger access to the public communications network. In another implementation, the same objective can be achieved by configuring an access network type of the application.

Referring to FIG. 3, FIG. 3 is a flowchart 2 of a processing method according to an embodiment of this disclosure. The processing method in this embodiment is applied to a first network element, and the first network element may include a RAN network element, configured to assist a terminal in determining a network access operation. As shown in FIG. 3, the processing method in this embodiment may include the following steps.

Step 301: Send, to a first target end, at least one of information of a private communications network supported by the first network element, a private-communications-service-capability supported by the first network element, and redirection information of the private communications network.

The first target end may include at least one of a terminal, a RAN network element, and a CN network element. The RAN network element may include at least one of the following: a gNB and an eNB.

It should be understood that, in specific implementation, the first network element may send the foregoing information to the first target end in a broadcasting manner, or may send the foregoing information by using another downlink message such as an RRC message, which may be specifically determined based on an actual requirement. This is not limited in this embodiment of this disclosure.

It should be noted that the redirection information of the private communications network may be used to indicate a network that supports the private communications network. In this way, even if the current network does not support the private communications network, the current network may broadcast the redirection information of the private communications network, so that the terminal may quickly find the network that supports the private communications network after obtaining the redirection information of the private communications network, thereby narrowing, for the terminal, a search range of networks that support the private communications network and improving efficiency in searching, by the terminal, for the network that supports the private communications network.

Further, information of the supported private communications network may include at least one of the following:

an identity of the supported private communications network, a frequency of the supported private communications network, and redirection frequency information of the supported private communications network.

Further, the private communications service capability may include at least one of the following: whether ultra-reliable low-latency communications (Ultra-Reliable Low-Latency Communications, URLLC) is supported and whether time-sensitive networking is supported.

The foregoing method may help the terminal to determine the network access operation.

Referring to FIG. 4, FIG. 4 is a flowchart 3 of a processing method according to an embodiment of this disclosure. The processing method in this embodiment is applied to a second network element, and the second network element may include a RAN network element, configured to: after a terminal initiates access, determine whether to allow the access of the terminal and/or determine an operation of selecting a CN network element. As shown in FIG. 4, the processing method in this embodiment may include the following steps.

Step 401: Obtain second information, where the second information may include at least one of the following: a private communications service capability of a terminal, information of a private communications service that the terminal requests to access, information of a private communications network that the terminal requests to access, a private-communications-service-capability supported by a CN network element, information of a private communications network supported by the CN network element, information of a private communications service accessed by the terminal, information of a private communications network accessed by the terminal, a private-communications-service-capability supported by a RAN network element, and information of a private communications network supported by the RAN network element.

Further, the information of the private communications network may include at least one of the following: an identity of the private communications network, a type of the private communications network, a serving area range of the private communications network, information of an operator network that supports the private communications network, information of an upper-layer application allowed to access the private communications network, and information of an upper-layer application prohibited to access the private communications network. For details, refer to the description in the method embodiment corresponding to FIG. 2. Details are not described herein again.

In one implementation, the second network element obtains, from the CN network element, at least one of the following: a private-communications-service-capability supported by the CN network element, information of a private communications network supported by the CN network element, information of a private communications service accessed by the terminal, and information of a private communications network accessed by the terminal.

In one implementation, the second network element obtains, from the terminal, at least one of the following: a private communications service capability of the terminal, information of a private communications service that the terminal requests to access, and information of a private communications network that the terminal requests to access.

In one implementation, the second network element obtains, from the RAN network element, at least one of the following: a private-communications-service-capability supported by the RAN network element and information of a private communications network supported by the RAN network element. In one implementation, when the second network element is a RAN network element, a private-communications-service-capability supported by another RAN network element and information of a private communications network supported by the another RAN network element are obtained from the another RAN network element.

Step 402: Based on the obtained second information, determine an operation of whether to allow the access of the terminal and/or determine an operation of selecting a CN network element.

Optionally, the CN network element may include at least one of the following: an AMF, an SMF, and a PCF.

Further, the determining an operation of whether to allow the access of the terminal may include at least one of the following:

when the second network element does not support the private communications network and the terminal requests to access a type-B private communications network, prohibiting the access of the terminal;

when the second network element supports a first private communications network and the terminal requests to access the first private communications network, allowing the access of the terminal;

when the second network element supports the first private communications network and the terminal requests to access a type-A second private communications network, allowing the access of the terminal; (that is, when the second network element supports the first private communications network, and the terminal requests to access a second private communications network and indicates a type A, allowing the access of the terminal);

when the second network element supports the first private communications network, the terminal is allowed to roam to the first private communications network, and the terminal requests to access a type-A private communications network, allowing the access of the terminal; (that is, when the second network element supports the first private communications network, and the terminal indicates the type A and indicates that roaming to the first private communications network is allowed, allowing the access of the terminal);

when the second network element supports a first public communications network, the terminal is allowed to roam to the first public communications network, and the terminal requests to access a type-A private communications network, allowing the access of the terminal; (that is, when the second network element supports the first public communications network, and the terminal is allowed to roam to the first public communications network and indicates the type A, allowing the access of the terminal);

when the second network element supports the first private communications network, the terminal comes from a second private communications network, the terminal is allowed to roam to the first private communications network, and the terminal requests to access a type-A private communications network, allowing the access of the terminal; (that is, when the second network element supports the first private communications network, the terminal indicates coming from the second private communications network, and the terminal is allowed to roam to the first private communications network and indicates the type A, allowing the access of the terminal); and when the second network element supports the first public communications network, the terminal comes from the first private communications network, the terminal is allowed to roam to the first public communications network, and the terminal requests to access a type-A private communications network, allowing the access of the terminal; (that is, when the second network element supports the first public communications network, the terminal indicates coming from the first private communications network, and the terminal is allowed to roam to the first public communications network and indicates the type A, allowing the access of the terminal).

Further, the determining an operation of selecting a CN network element may include at least one of the following:

selecting a CN network element supporting the private communications network that the terminal requests to access; (in one implementation, when the second network element supports the private communications network, selecting the CN network element supporting the private communications network that the terminal requests to access);

selecting a CN network element supporting the private communications service that the terminal requests to access; (in one implementation, when the second network element supports the private communications network, selecting the CN network element supporting the private communications service that the terminal requests to access);

when the second network element supports the first private communications network and the terminal requests to access a type-A second private communications network, selecting a CN network element that supports the first private communications network; (that is, when the second network element supports the first private communications network and the terminal requests to access the second private communications network and indicates the type A, selecting the CN network element that supports the first private communications network);

when the second network element supports the first private communications network, the terminal is allowed to roam to the first private communications network, and the terminal requests to access a type-A private communications network, selecting a CN network element that supports the first private communications network; (that is, when the second network element supports the first private communications network, and the terminal is allowed to roam to the first private communications network and indicates the type A, selecting the CN network element that supports the first private communications network);

when the second network element supports the first public communications network, the terminal is allowed to roam to the first public communications network, and the terminal requests to access a type-A private communications network, selecting a CN network element that supports the first public communications network; (that is, when the second network element supports the first public communications network, and the terminal is allowed to roam to the first public communications network and indicates the type A, selecting the CN network element that supports the first public communications network);

when the second network element supports the first private communications network, the terminal comes from the second private communications network, the terminal is allowed to roam to the first private communications network, and the terminal requests to access the type-A private communications network, selecting a CN network element that supports the first private communications network; (that is, when the second network element supports the first private communications network, the terminal indicates coming from the second private communications network, and the terminal is allowed to roam to the first private communications network and indicates the type A, selecting the CN network element that supports the first private communications network); and when the second network element supports the first public communications network, the terminal comes from the first private communications network, the terminal is allowed to roam to the first public communications network, and the terminal requests to access a type-A private communications network, selecting a CN network element that supports the first public communications network; (that is, when the second network element supports the first public communications network, the terminal indicates coming from the first private communications network, and the terminal is allowed to roam to the first public communications network and indicates the type A, selecting the CN network element that supports the first public communications network).

By using the foregoing method, after the terminal initiates access, whether to allow access of the terminal and/or the operation of selecting the CN network element can be determined.

Figure 5:
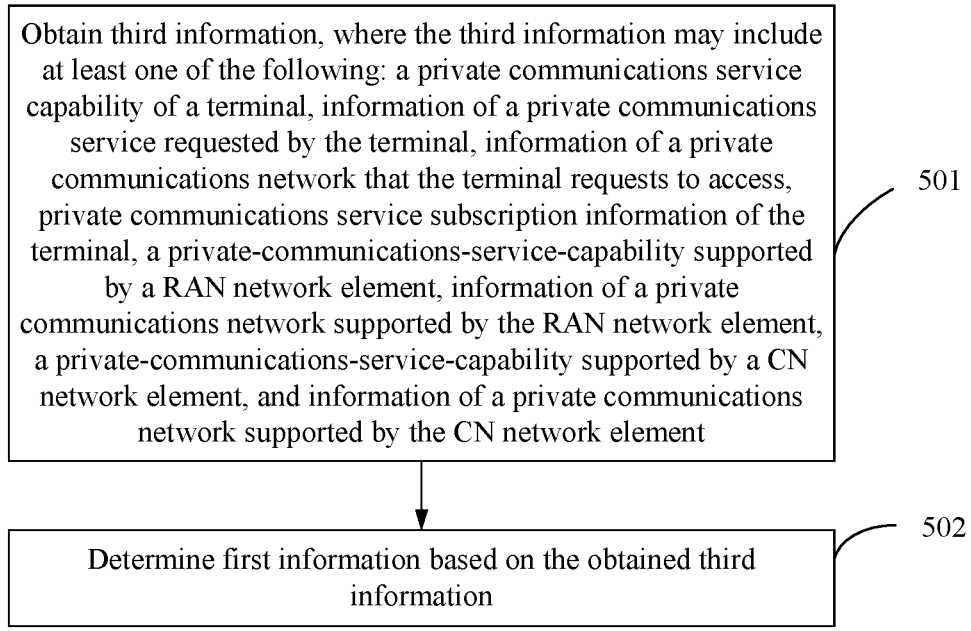
FIG. 5 is a flowchart 4 of a processing method according to an embodiment of this disclosure.

Referring to FIG. 5, FIG. 5 is a flowchart 4 of a processing method according to an embodiment of this disclosure. The processing method in this embodiment is applied to a third network element, and the third network element may include a CN network element. As shown in FIG. 5, the processing method in this embodiment may include the following steps.

Step 501: Obtain third information, where the third information may include at least one of the following: a private communications service capability of a terminal, information of a private communications service requested by the terminal, information of a private communications network that the terminal requests to access, private communications service subscription information of the terminal, a private-communications-service-capability supported by a RAN network element, information of a private communications network supported by the RAN network element, a private-communications-service-capability supported by a CN network element, and information of a private communications network supported by the CN network element; and Step 502: Determine first information based on the obtained third information.

The first information is described in the method embodiment corresponding to FIG. 2, and details are not described herein again.

Further, after the determining first information based on the obtained third information, the method may further include:

sending the first information to a second target end, where the second target end may include at least one of the terminal and the RAN network element.

Certainly, in some implementations, after the first information is determined based on the obtained third information, the first information may also be solidified in a communication protocol between the terminal and the network element. In this way, the terminal and the network element may directly read the first information from the protocol, thereby reducing signaling exchange between the terminal and the network element and saving system resources.

In such a manner, content of the first information may be determined.

It should be noted that the method embodiments corresponding to FIG. 2, FIG. 3, FIG. 4, and FIG. 5 may be implemented separately or be implemented in combination, which is not limited in the embodiments of this disclosure.

The solution implemented in combination with FIG. 2, FIG. 3, and FIG. 5 can help the terminal to determine a network access operation. The solution implemented in combination with FIG. 2, FIG. 4, and FIG. 5 can help the terminal determine, after determining the network access operation and initiating access, whether to allow access of the terminal and/or the operation of selecting the core network network element.

Figure 6:
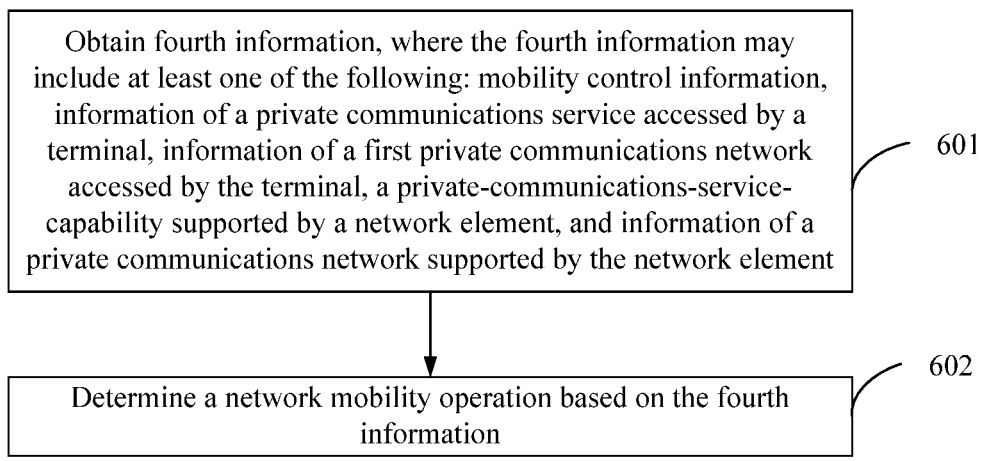
FIG. 6 is a flowchart 5 of a processing method according to an embodiment of this disclosure.

Referring to FIG. 6, FIG. 6 is a flowchart 5 of a processing method according to an embodiment of this disclosure. The processing method of this embodiment is applied to a terminal. As shown in FIG. 6, the processing method in this embodiment may include the following steps.

Step 601: Obtain fourth information, where the fourth information may include at least one of the following: mobility control information, information of a private communications service accessed by a terminal, information of a first private communications network accessed by the terminal, a private-communications-service-capability supported by a network element, and information of a private communications network supported by the network element.

Optionally, the terminal may obtain the fourth information from at least one of the following: a CN network element, a RAN network element, an AMF, and an NG RAN.

Further, for the information of the first private communications network accessed by the terminal, refer to the description of the information of the private communications network in the method embodiment corresponding to FIG. 2. Details are not described herein again.

Further, the mobility control information may include at least one of the following:

whether access to a second network is allowed, network information of a second network allowed to be accessed, network information of a second network prohibited to be accessed, information of a private communications service's application allowed to access a public communications network, and information of a first private communications networks application allowed to access the second network.

For details, refer to the description of the mobility control information in the method embodiment corresponding to FIG. 2. Details are not described herein again. The second network may include at least one of the following: a second private communications network and a public communications network.

Further, the terminal may be at least one of the following: a terminal of the private communications service and a terminal of the first private communications network. The first private communications network may be a home network of the terminal.

Further, the upper-layer application may be at least one of the following: an upper-layer application of the private communications service and an upper-layer application of the first private communications network.

Further, for details about the application information, refer to the description of the application information in the method embodiment corresponding to FIG. 2. Details are not described herein again.

The network element may include at least one of the following: a RAN network element and a CN network element.

Step 602: Determine a network mobility operation based on the fourth information.

Optionally, the network mobility operation may include at least one of the following: a mobility operation within the first private communications network, a mobility operation between the first private communications network and the second private communications network, and a mobility operation between the private communications network and the public communications network.

The determining a network mobility operation may include at least one of the following: determining whether to access a second network, sending first mobility information to the second network, and prohibiting a roaming-related operation.

Further, the determining whether to access a second network may include at least one of the following:

when access to the second network is allowed, accessing the second network;

when moving out of the first private communications network, accessing the second network based on network information of the second network allowed to be access; and when access to the second network is prohibited, prohibiting access to the second network.

In one implementation, when the terminal moves between the private communications network and the public communications network or the terminal moves between the first private communications network and the second network, the first mobility information is sent to the second network.

Further, the prohibiting a roaming-related operation may include at least one of the following: releasing a context of the terminal, suspending a protocol data unit (Protocol Data Unit, PDU) session, and releasing a user-plane connection of the PDU session.

In one implementation, when the terminal moves out of the first private communications network and is not allowed to access the second network, prohibiting the roaming-related operation is executed. For example, a type-B terminal is not allowed to roam. When the type-B terminal moves out of the private communications network, prohibiting the roaming-related operation may be executed.

Further, the context of the terminal includes at least one of the following: a mobility management context, a session management context, a PDU session context, and a registration context.

By using the foregoing method, the network mobility operation such as a mobility operation within the first private communications network and/or a mobility operation between the first private communications network and the second network can be determined.

Figure 7:
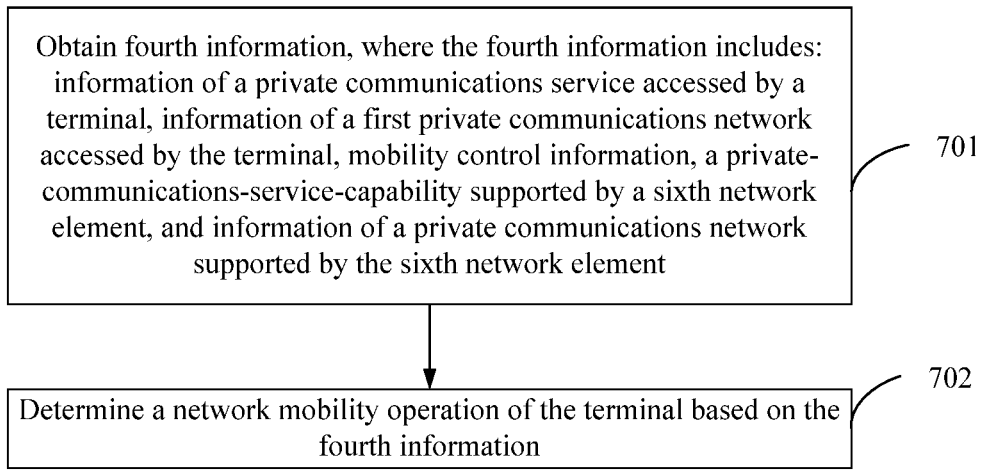
FIG. 7 is a flowchart 6 of a processing method according to an embodiment of this disclosure.

Referring to FIG. 7, FIG. 7 is a flowchart 6 of a processing method according to an embodiment of this disclosure. The processing method in this embodiment is applied to a fourth network element, and the fourth network element may include at least one of the following: a RAN network element, an AMF, or a SMF. As shown in FIG. 7, the processing method in this embodiment may include the following steps.

Step 701: Obtain fourth information, where the fourth information may include at least one of the following: information of a private communications service accessed by a terminal, information of a first private communications network accessed by the terminal, mobility control information, a private-communications-service-capability supported by a sixth network element, and information of a private communications network supported by the sixth network element.

In one implementation, the sixth network element is a network element different from the fourth network element.

Optionally, the fourth network element may obtain the fourth information from at least one of the following: a CN network element, a RAN network element, an AMF, and an NG RAN.

Further, for the information of the first private communications network accessed by the terminal, refer to the description of the information of the private communications network in the method embodiment corresponding to FIG. 2. Details are not described herein again.

Further, the mobility control information may include at least one of the following:

whether access to a second network is allowed, network information of a second network allowed to be accessed, network information of a second network prohibited to be accessed, information of a private communications service's application allowed to access a public communications network, and information of a first private communications networks application allowed to access the second network.

The second network may include at least one of the following: a second private communications network and a public communications network.

Further, the terminal may be at least one of the following: a terminal of the private communications service and a terminal of the first private communications network. The first private communications network may be a home network of the terminal.

Further, the upper-layer application may be at least one of the following: an upper-layer application of the private communications service and an upper-layer application of the first private communications network.

Optionally, the sixth network element may include at least one of the following: a RAN network element, a CN network element, and an AMF. However, it should be understood that the sixth network element may be a network element different from the fourth network element.

Step 702: Determine a network mobility operation of the terminal based on the fourth information.

In one implementation, the network mobility operation may be performed in at least one of the following scenarios: a mobility operation within the first private communications network and a mobility operation between the first private communications network and the second network.

The second network may include at least one of the following: a second private communications network and a public communications network.

Further, the determining a network mobility operation of the terminal may include at least one of the following: selecting a target network element, sending the fourth information to the target network element, switching the terminal to the target network element, sending first mobility information, and prohibiting a roaming-related operation.

In one implementation, the switching the terminal to the target network element may include at least one of the following: handing over the terminal to the target network element, redirecting the terminal to the target network element, and initiating a handover based on a first interface. The first interface is an interface between a CN and a RAN, such as an NG interface.

In one implementation, the first mobility information may include at least one of the following: an instruction for moving from a public communications network to a private communications network, an instruction for moving from a private communications network to a public communications network, an instruction for moving out of the private communications network, and an instruction for moving from the first private communications network to the second network.

Optionally, the target network element includes at least one of the following: a target RAN network element, a target CN network element, and a target AMF.

Further, when the terminal moves within the first private communications network or moves from a second network to the first private communications network, the selecting a target network element may include at least one of the following:

selecting, as the target network element, the sixth network element that supports the private communications network accessed by the terminal;

when the sixth network element supports the first private communications network and the terminal accesses the first private communications network, selecting, as the target network element, the sixth network element that supports the first private communications network;

selecting, as the target network element, the sixth network element that supports the private communications service accessed by the terminal;

when the sixth network element supports a first private communications service and the terminal accesses the first private communications service, selecting, as the target network element, the sixth network element that supports the first private communications service; and when the sixth network element does not support the private communications network accessed by the terminal, selecting a target network element of an access-allowing second network based on the mobility control information.

Further, when the terminal moves out of the first private communications network, the operation of selecting a target network element may include least one of the following:

when access to a second network is allowed, selecting, as the target network element, the sixth network element that supports the second network; and when access to the second network is allowed, initiating an operation of switching the terminal to the second network.

During selection of the target network element, if both a sixth network element supporting the first private communications network and a sixth network element supporting the second network are present, the sixth network element supporting the first private communications network may be preferentially selected as the target network element.

During selection of the target network element, if a candidate sixth network element supporting both the first private communications network and the second network, the information of the first private communications network may be sent to the target network element. It is easy to understand that, based on the information of the first private communications network, the target network element makes clear that the terminal accesses the first private communications network rather than the second network.

Further, when the terminal moves between the first private communications network and the second network, the determining a network mobility operation of the terminal may include at least one of the following:

sending first mobility information; and initiating a handover based on the first interface, where the first interface is a communications interface between a RAN network element and a CN network element, such as an NG interface.

Further, the prohibiting a roaming-related operation may include at least one of the following: releasing a context of the terminal, suspending a protocol data unit PDU session, and releasing a user-plane connection of the PDU session.

In one implementation, when the terminal moves out of the first private communications network and is not allowed to access the second network, prohibiting the roaming-related operation is executed. For example, a type-B terminal is not allowed to roam. When the type-B terminal moves out of the private communications network, prohibiting the roaming-related operation may be executed. Further, the context of the terminal includes at least one of the following: a mobility management context, a session management context, a PDU session context, and a registration context.

The foregoing method can help the terminal to determine the network mobility operation such as a mobility operation within the first private communications network and/or a mobility operation between the first private communications network and the second network.

Figure 8:
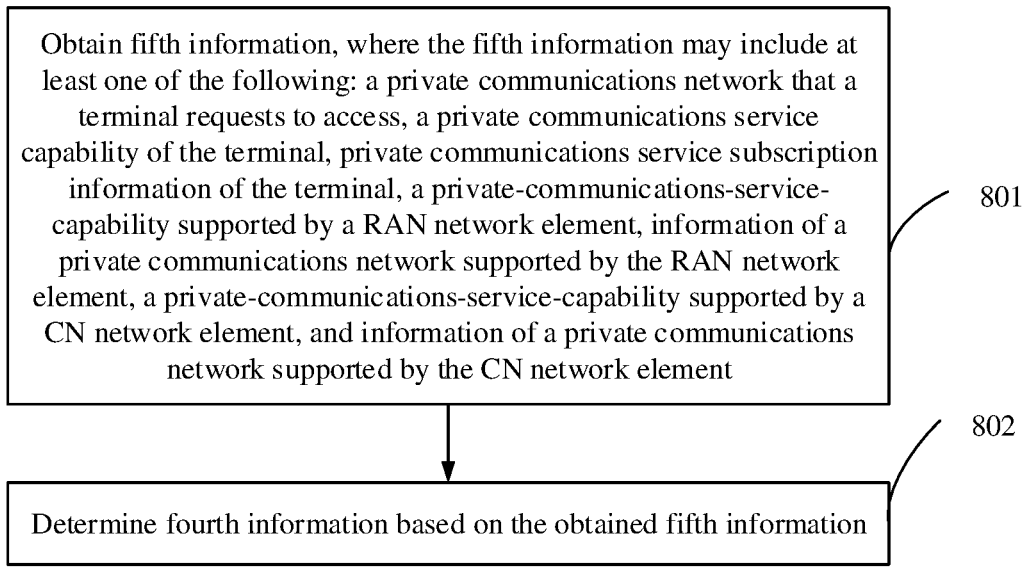
FIG. 8 is a flowchart 7 of a processing method according to an embodiment of this disclosure.

Referring to FIG. 8, FIG. 8 is a flowchart 7 of a processing method according to an embodiment of this disclosure. The processing method in this embodiment is applied to a fifth network element, and the fifth network element may include a CN network element. As shown in FIG. 8, the processing method in this embodiment may include the following steps.

Step 801: Obtain fifth information, where the fifth information may include at least one of the following: a private communications network that a terminal requests to access, a private communications service capability of the terminal, private communications service subscription information of the terminal, a private-communications-service-capability supported by a RAN network element, information of a private communications network supported by the RAN network element, a private-communications-service-capability supported by a CN network element, and information of a private communications network supported by the CN network element.

Step 802: Determine fourth information based on the obtained fifth information.

For details about the fourth information, refer to the description of the fourth information in the method embodiment corresponding to FIG. 6. Details are not described herein again.

Optionally, after the determining fourth information based on the obtained fifth information, the method may further include:

sending the fourth information to a second target end, where the second target end may include at least one of the following: the terminal and the RAN network element.

Certainly, in some implementations, after the fourth information is determined based on the obtained fifth information, the fourth information may also be solidified in a communication protocol between the terminal and the network element. In this way, the terminal and the network element may directly read the fourth information from the protocol, thereby reducing signaling exchange between the terminal and the network element and saving system resources.

The fourth information can be determined by using the foregoing method.

It should be noted that the method embodiments corresponding to FIG. 6, FIG. 7, and FIG. 8 may be implemented separately or be implemented in combination, which is not limited in the embodiments of this disclosure.

The solution implemented in combination with FIG. 6, FIG. 7, and FIG. 8 can help the terminal to determine the network mobility operation such as a mobility operation within the first private communications network and/or a mobility operation between the first private communications network and the second network.

For ease of understanding, this disclosure provides the following several embodiments to describe the processing methods of the embodiments of this disclosure.

Embodiment 1: Registration or Location Update

This embodiment mainly describes a process of registration or location update performed by a terminal subscribing to a private communications network that roams to a public communications network.

It should be noted that an AMF in this embodiment refers to a new AMF in a registration scenario.

Figure 9:
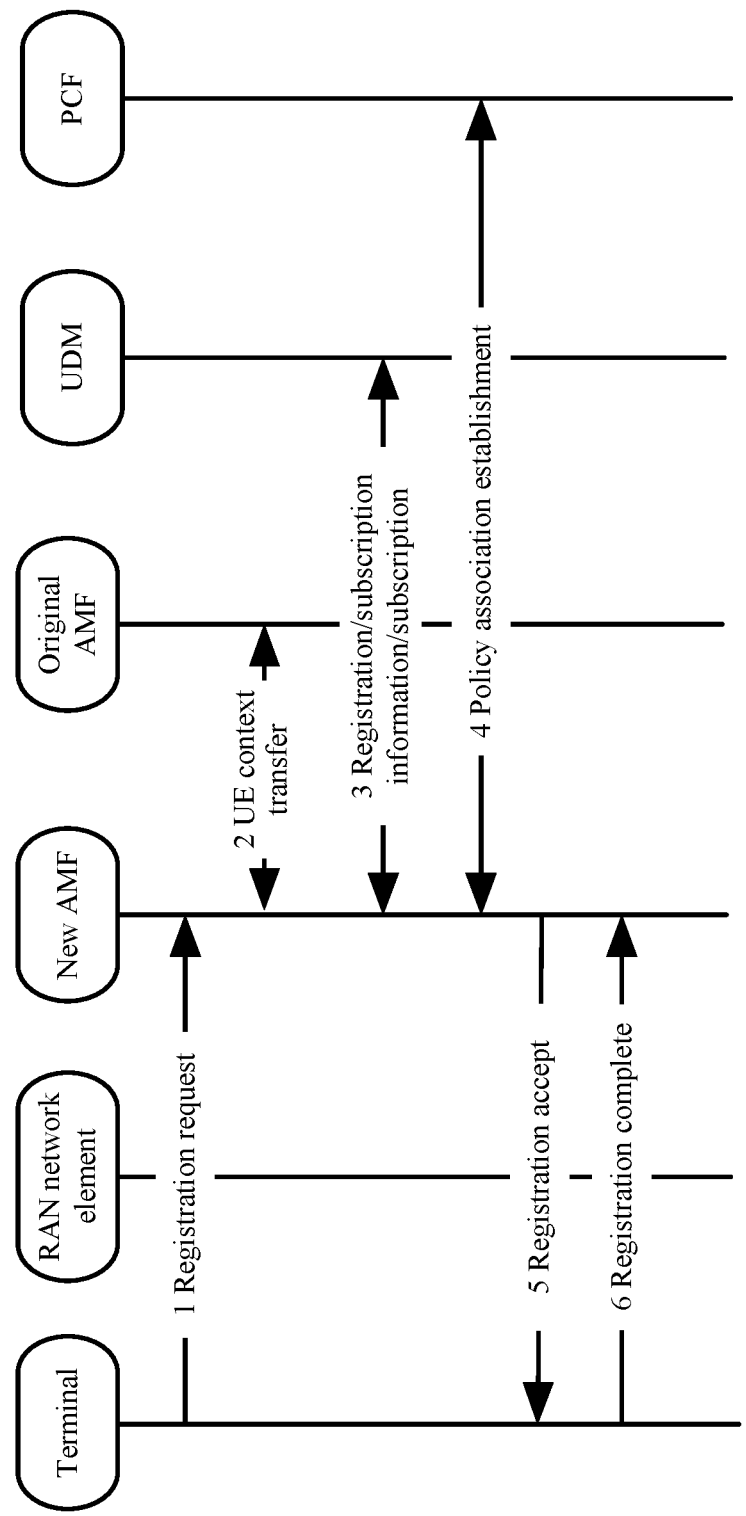
FIG. 9 is a flowchart 8 of a processing method according to an embodiment of this disclosure.

Referring to FIG. 9, as shown in FIG. 9, the following steps may be included.

Step 1: The terminal selects a RAN network element of a private communications network based on first information. The terminal sends a registration request message to the AMF through the RAN network element.

During specific implementation, an upper-layer application of the terminal generates data, and the data requires a private communications service through the private communications network.

In one implementation, the terminal determines, based on information about an allowed area range for the private communications service in the pre-configured first information, whether the RAN network element is a serving area of the private communications network. If so, registration with the private communications network is initiated.

In another implementation, the RAN network element broadcasts information of a supported private communications network. The terminal compares an identity of the private communications network included in the first information with an identity of the supported private communications network broadcast by the RAN network element, and selects a RAN network element supporting the private communications network to initiate registration with the private communications network.

Step 2: Optionally, when there is an original AMF, the AMF initiates a UE context transfer to the original AMF to obtain a context of the terminal. It should be understood that step 2 is included in a location update scenario while step 2 may not be included in the registration scenario.

Step 3: The AMF performs registration on a UDM and obtains subscription data of the terminal.

Optionally, the AMF may obtain both public communications service-related subscription data of the terminal and private communications service-related subscription data of the terminal.

The AMF obtains subscription information of the terminal from the UDM. Optionally, the UDM sends private communications network subscription information of the terminal to the AMF.

Step 4: The AMF selects a PCF based on the first information. The PCF is a PCF in the private communications network. The AMF establishes a terminal-related policy association with the PCF. Optionally, a policy association establishment message sent to the AMF by the PCF may include the first information.

Step 5: The AMF sends a registration accept message to the terminal through the RAN network element. Optionally, the registration accept message may include the first information. After receiving the first information, the terminal may update local first information based on the first information.

The AMF sends an NG interface message to a 5G radio access network network element, where the NG interface message includes a registration accept message. Optionally, the NG interface message includes fourth information.

The 5G radio access network sends an RRC message to the terminal, where the RRC message includes a registration accept message.

Step 6: The terminal sends a registration completion message to the AMF through the RAN network element.

Embodiment 2: Xn-Based Handover within the Private Communications Network

Figure 10:
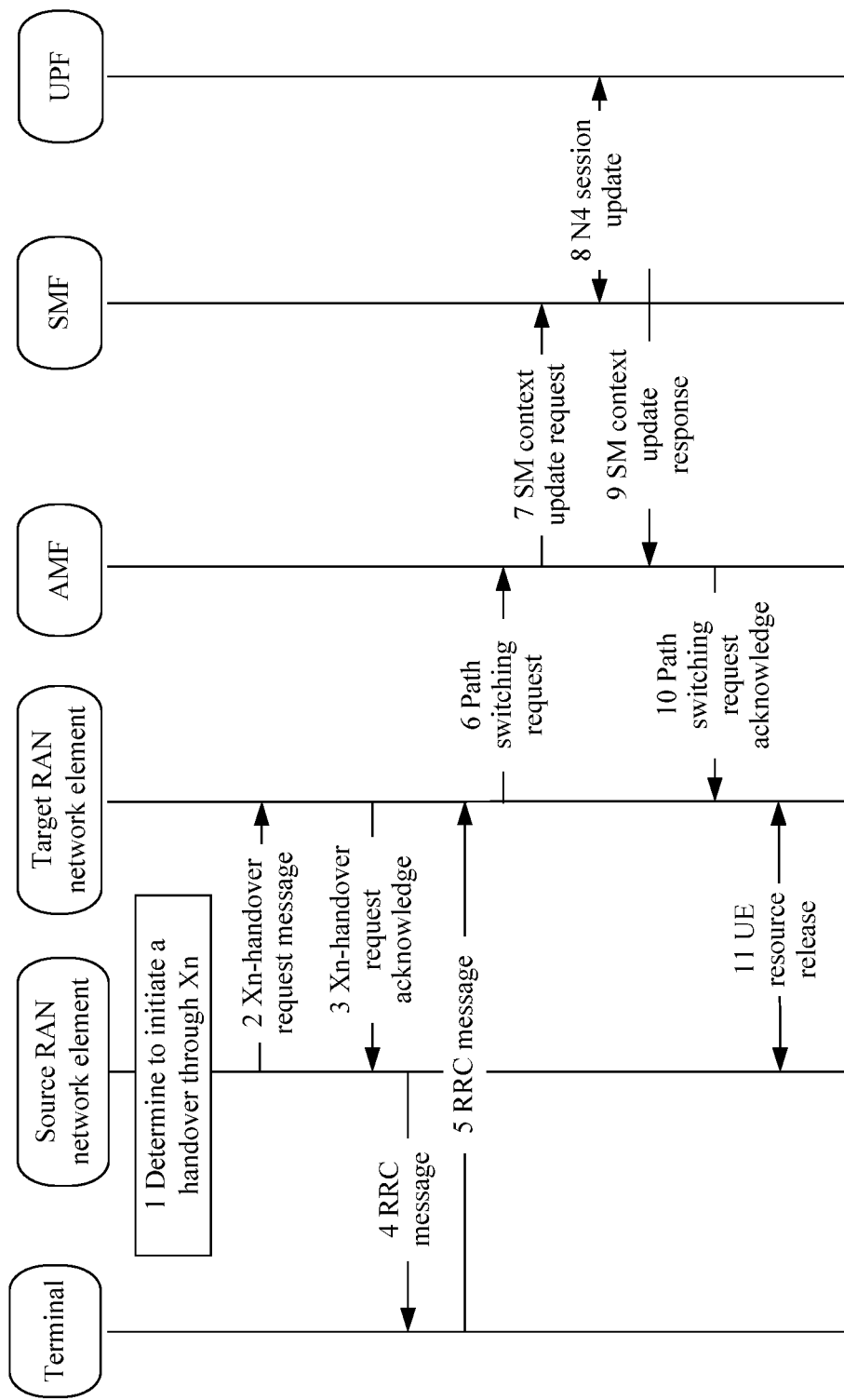
FIG. 10 is a flowchart 9 of a processing method according to an embodiment of this disclosure.

This embodiment mainly describes an Xn-interface-based handover process in the private communications network for the terminal subscribing to the private communications network. Referring to FIG. 10, as shown in FIG. 10, the following steps may be included.

Step 1: Based on obtained fourth information, when a handover event occurs, a source RAN network element determines that a target cell belongs to a serving area of the private communications network, the source RAN network element may initiate an Xn-interface-based handover or initiate an N2-handover. This embodiment is an Xn-interface-based handover embodiment.

Step 2: The source RAN network element sends an Xn-handover request message to the target RAN network element. Optionally, the Xn-handover request message includes first mobility information.

Figure 11:
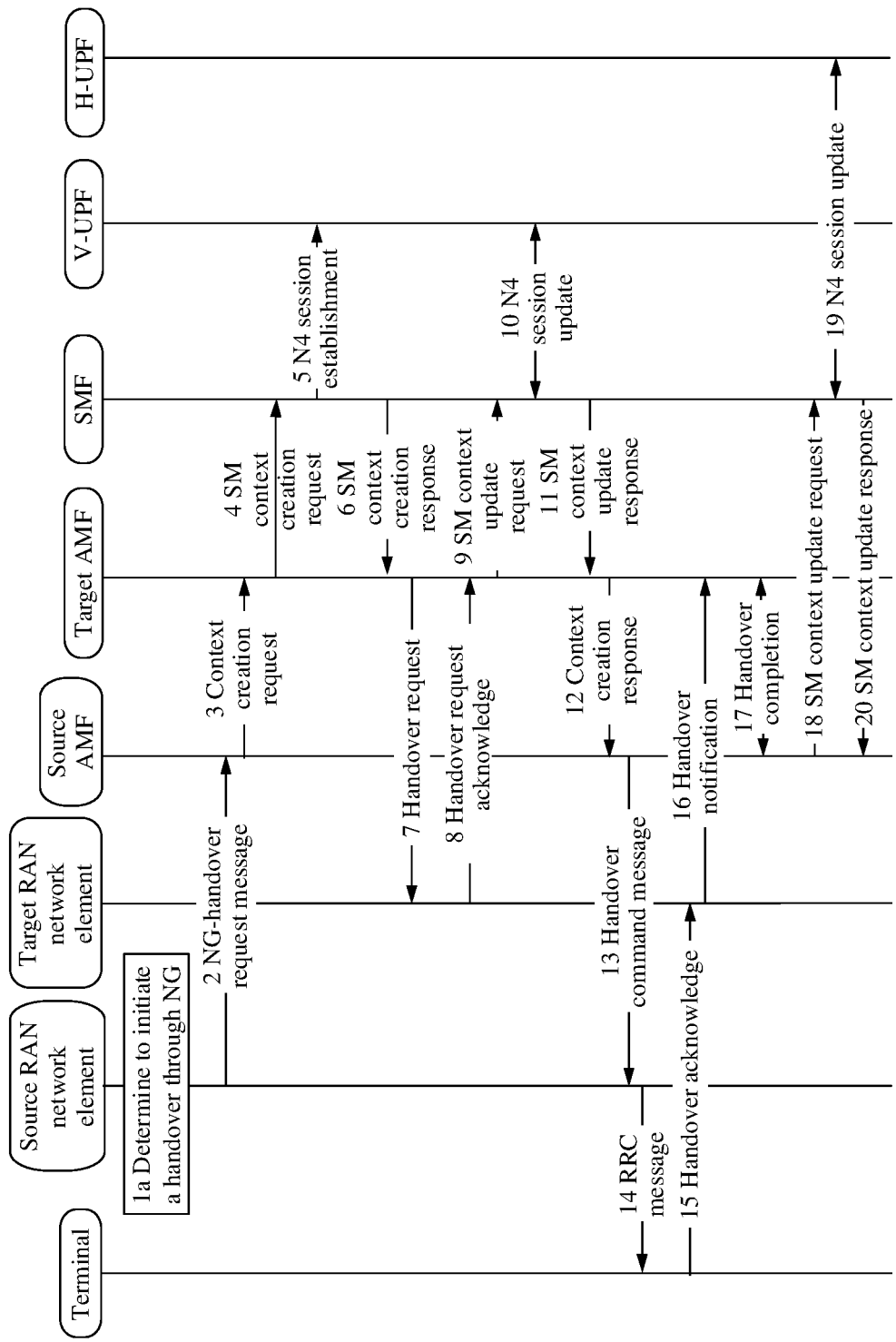
FIG. 11 is a flowchart 10 of a processing method according to an embodiment of this disclosure.

Embodiment 3: NG-Interface-Based Handover within the Private Communications Network This embodiment mainly describes an NG-interface-based handover process in the private communications network for the terminal subscribing to the private communications network. Referring to FIG. 11, as shown in FIG. 11, the following steps may be included.

Step 1: Based on obtained fourth information, when a handover event occurs, a source RAN network element determines that a target cell belongs to the serving area of the private communications network, the source RAN network element may initiate an NG-interface-based handover or an Xn-interface-based handover. This embodiment is an NG-interface-based handover embodiment.

Step 2: The RAN network element sends an NG-handover request message to a target RAN network element. Optionally, the NG-handover request message includes first mobility information.

Step 3: A source AMF selects a target AMF.

The source AMF sends a context creation request to the target AMF.

Step 4: The target AMF sends an SM context creation request to an SMF.

Step 5: Optionally, the SMF selects a V-UPF.

A V-SMF sends an N4 session establishment to the selected V-UPF.

Step 6: The SMF sends an SM context creation response to the target AMF.

Step 7: The target AMF sends a handover request to the target RAN network element.

Step 8: The target RAN network element sends a handover request acknowledge to the target AMF.

Step 9: The target AMF sends an SM context update request to the SMF, requesting to update an N3-interface RAN-side address of the PDU session.

Step 10: The SMF sends an N4 session update to the V-UPF.

Step 11: The SMF returns an SM context update response to the target AMF.

Step 12: The target AMF sends a context creation response to the source AMF.

Step 13: The source AMF sends a handover command to the source RAN network element.

Step 14: The RAN network element sends an RRC message to the terminal, where the RRC message includes a handover command Step 15: The terminal accesses the target RAN network element.

Step 16: The target RAN network element sends a handover notification to the target AMF.

Step 17: The target AMF sends a handover completion to the source AMF.

Step 18: The source AMF sends an SM context update request message to the SMF.

Because of presence of an intermediate V-UPF, the message requests to update downlink AN channel information of the H-UPF.

Step 19: The SMF sends an N4 session modification to the H-UPF.

Step 20: The SMF sends an SM context update response to the source AMF.

Figure 12:
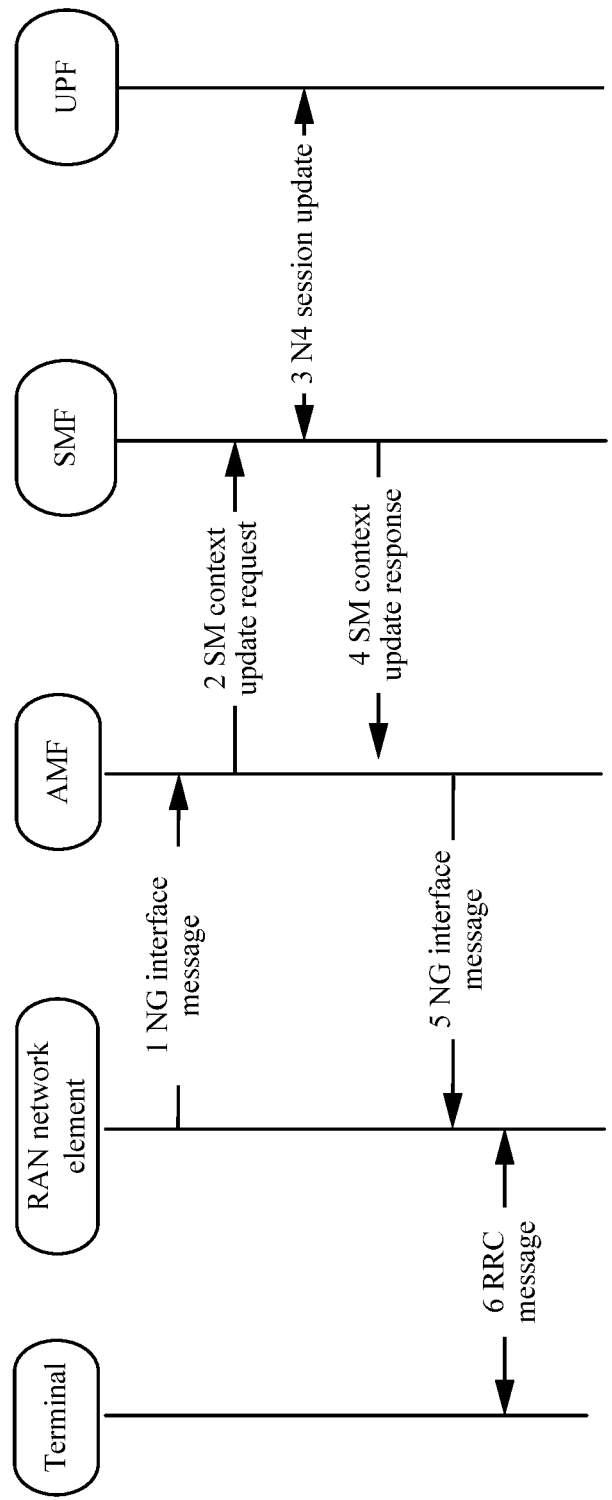
FIG. 12 is a flowchart 11 of a processing method according to an embodiment of this disclosure.

Embodiment 4: Release or Suspension upon Moving Out of the Private Communications Network in a Roaming-Prohibited Manner This embodiment mainly describes a process in which the terminal subscribing to the private communications network is handed over from the private communications network to the public communications network. Referring to FIG. 12, as shown in FIG. 12, the following steps may be included.

Step 1: Based on obtained fourth information, when a handover event occurs, a RAN network element determines that a target cell does not belong to a serving area of the private communications network. The RAN network element sends an NG interface message to an AMF, such as an NG-handover request or an NG interface connection release request for the terminal.

Optionally, the NG interface message includes first mobility information, and the first mobility information includes one of the following: an instruction for moving from a public communications network to a private communications network, an instruction for moving from a private communications network to a public communications network, an identity of a private communications network supported by a source RAN network element or a source cell, an identity of a private communications network supported by a target RAN network element or a target cell, and a network type supported by a target node.

Step 2: The AMF sends an SM context update request to an SMF.

Optionally, the first mobility information is included.

Step 3: The SMF releases a PDU session or suspends a PDU session based on the first mobility information, where the SMF sends an N4 session modification or an N4 session release to a UPF.

Step 4: The SMF sends an SM context update response to the AMF.

Step 5: The AMF sends an NG interface message to the RAN network element.

Step 6: The RAN network element releases an RRC connection of the terminal by using an RRC message or configures the terminal as an RRC inactive state.

Figure 13:
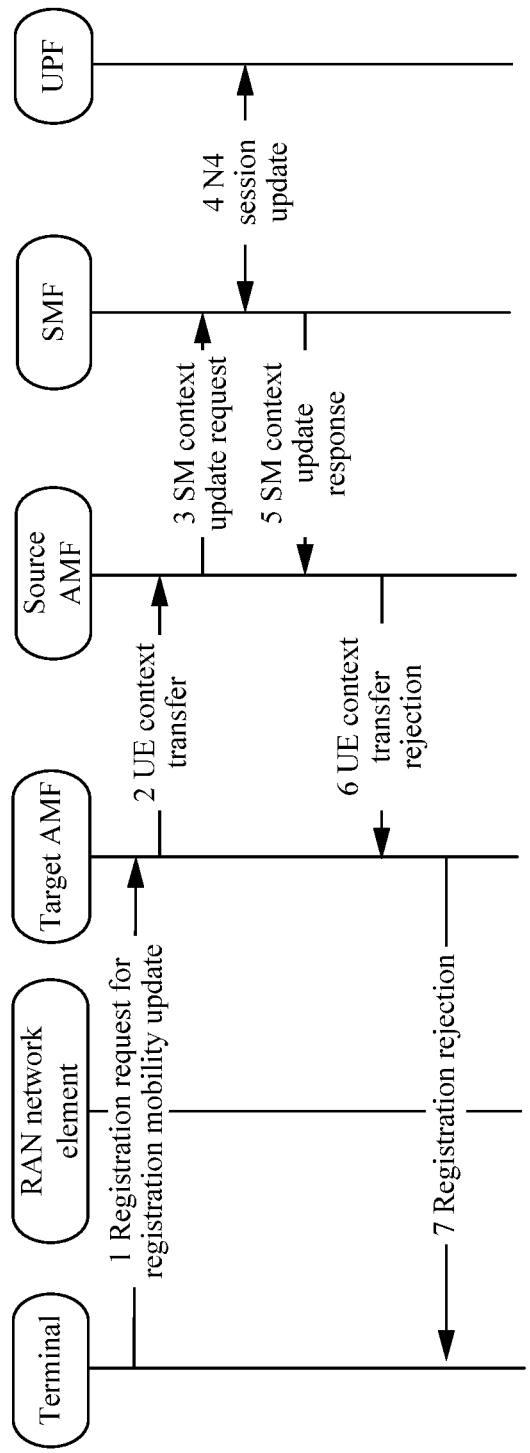
FIG. 13 is a flowchart 12 of a processing method according to an embodiment of this disclosure.

Embodiment 5: Location Update from the Private Communications Network to the Public Communications Network in Roaming-Prohibited Manner This embodiment mainly describes a process of initiating a location update in the public communications network by a terminal, not allowed to roam to the public communications network, of the private communications network. Referring to FIG. 13, as shown in FIG. 13, the following steps may be included.

Step 1: The terminal sends a registration request message to a target AMF through a RAN network element, where the registration request message includes information of a source AMF.

Step 2: The target AMF sends a UE context transfer to the source AMF. The UE context transfer message includes information (ID, type) of a target network. The information of the target network indicates information of a public transfer network.

Step 3: Based on the information of the target network, the source AMF determines that the terminal has moved out of a serving range of the private communications network.

The source AMF sends a PDU session update request or a terminal location notification message to the SMF, requesting to suspend a PDU session or release a PDU session.

Step 4: The SMF sends an N4 session modification or an N4 session release to a UPF.

Step 5: The SMF sends a PDU session update response to the source AMF.

Step 6: The source AMF sends a UE context transfer rejection to the target AMF, where a rejection reason indicates that the terminal moves out of a range of the private communications network.

The target AMF may further obtain subscription information of the terminal from a UDM to determine that the terminal is not allowed to access a current network.

Step 7: The target AMF returns a registration rejection to the terminal through the RAN node.

Figure 14:
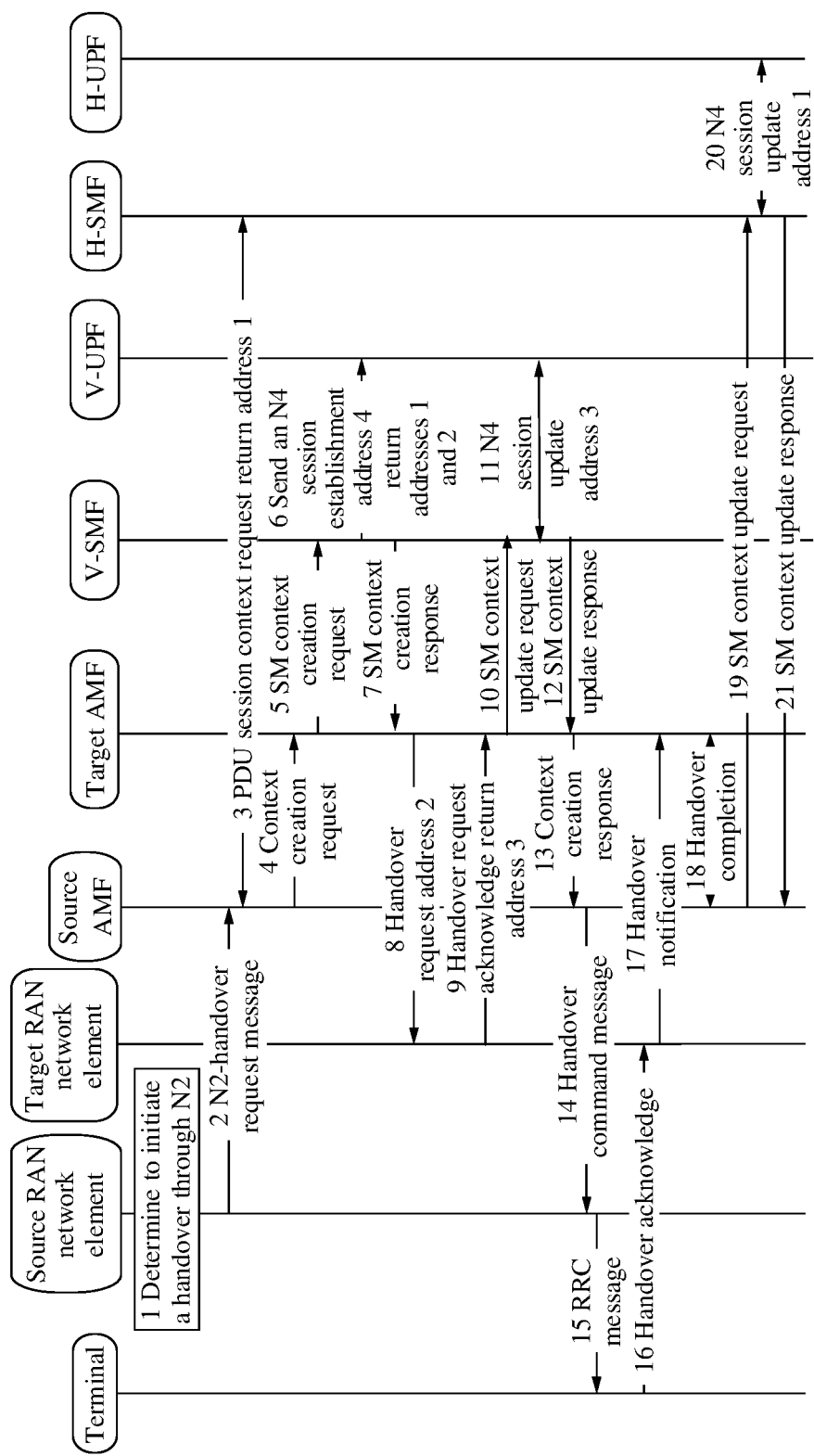
FIG. 14 is a flowchart 13 of a processing method according to an embodiment of this disclosure.

Embodiment 6: Handover from the Private Communications Network to the Public Communications Network in a Roaming-Allowed Manner This embodiment mainly describes a process in which the terminal subscribing to the private communications network is handed over from the private communications network to the public communications network. Referring to FIG. 14, as shown in FIG. 14, the following steps may be included.

Step 1: Based on obtained fourth information, when a handover event occurs, a source RAN network element determines that a target cell does not belong to a serving area of the private communications network, and then the source RAN network element initiates an N2-handover.

Step 2: The source RAN network element sends an N2-handover request to a source network. Optionally, the N2-handover request message includes first mobility information.

Step 3: A source AMF sends a PDU session context request to an H-SMF, optionally including the first mobility information.

The H-SMF selects a to-be-switched PDU session based on the first mobility indication information. In one implementation, not all PDU sessions are allowed to switch from the private communications network to the public communications network.

Step 4: The source AMF selects a target AMF. The source AMF sends a context creation request to the target AMF.

Step 5: The target AMF sends an SM context creation request to a V-SMF.

Step 6: The V-SMF select a V-UPP. The V-SMF sends an N4 session establishment to the selected V-UPF.

Step 7: The V-SMF sends an SM context creation response to the target AMF.

Step 8: The target AMF sends a handover request to the target RAN network element.

Step 9: The target RAN network element sends a handover request acknowledge to the target AMF.

Step 10: The target AMF sends an SM context update request to the V-SMF, requesting to update an N3-interface RAN-side address of the PDU session.

Step 11: The V-SMF sends an N4 session update to the V-UPF.

Step 12: The V-SMF returns an SM context update response to the target AMF.

Step 13: The target AMF sends a context creation response to the source AMF.

Step 14: The source AMF sends a handover command to the source RAN network element.

Step 15: The source RAN network element sends an RRC message to the terminal, where the RRC message includes a handover command Step 16: The terminal accesses the target RAN network element.

Step 17: The target RAN network element sends a handover notification to the target AMF.

Step 18: The target AMF sends a handover completion to the source AMF.

Step 19: The source AMF sends an SM context update request message to the H-SMF.

Because of presence of an intermediate V-UPF, the message requests to update downlink AN channel information of the H-UPF.

Step 20: The H-SMF sends an N4 session modification to the H-UPF.

Step 21: The H-SMF sends an SM context update response to the source AMF.

After the handover is complete, data between the terminal and a DN is transmitted through a data channel between the target RAN network element, the V-UPF, and the H-UPF. Session management signaling between the terminal and the H-SMF is transmitted through the target RAN network element, the AMF, and the V-SMF.

When the terminal is handed over from the private communications network to the public communications network, because possibly not all private communications services on the terminal are switched to the public communications network, the H-SMF may determine, based on an instruction provided by the RAN network element, which private communications services can be switched to the public communications network.

The processing method in the embodiments of this disclosure may include at least the following improvements:

a policy related to the private communications service can be provided to the terminal to guide an operation of the terminal; and mobility control information can be provided to the terminal and the radio access network to guide a network mobility operation, such as a mobility operation within the private communications network and/or a mobility operation between the private communications network and the public communications network.

In this way, by using the processing method in the embodiments of this disclosure, the terminal can be provided with guidance on a service initiation manner and mobility control for the private communications service.

Figure 15:
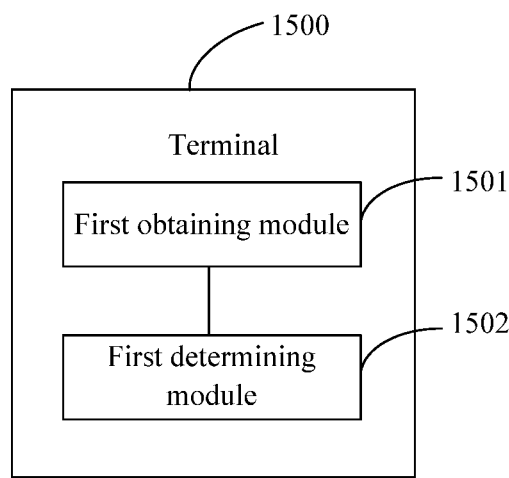
FIG. 15 is a structural diagram 1 of a terminal according to an embodiment of this disclosure.

Referring to FIG. 15, FIG. 15 is a structural diagram 1 of a terminal according to an embodiment of this disclosure. As shown in FIG. 15, the terminal 1500 includes:

a first obtaining module 1501, configured to obtain first information, where the first information includes at least one of the following: information of a private communications service, mobility control information, and routing information of an upper-layer application; and a first determining module 1502, configured to determine a network access operation based on the first information.

Optionally, the first determining module 1502 is specifically configured to: determine a type of a communications network to access, select a communications network to access, and determine a manner of accessing a first network.

The first network is a network that supports the private communications service.

Optionally, the first determining module 1502 is specifically configured to:

determine, based on an allowed communications network type for the upper-layer application, to access a private communications network or to access a public communications network;

select a communications network to access based on a private communications network supported by a network; and send, to the first network, at least one of a private-communications-service-capability supported by the terminal and information of a private communications network that the terminal requests to access.

Optionally, the information of the private communications service includes at least one of the following:

indication information of the private communications service, information of an operator network that supports the private communications network, information of the private communications network, information about an allowed area range for the private communications service, information about a prohibited area range for the private communications service, application information of an upper-layer application that allows the private communications service, and application information of an upper-layer application that prohibits the private communications service.

Optionally, the information of the private communications network includes at least one of the following: a PLMN identity, an identity of the private communications network, and a type of the private communications network.

Optionally, the type of the private communications network includes at least one of the following: type A and type B.

Optionally, the mobility control information may include at least one of the following:

whether access to a second network is allowed, network information of a second network allowed to be accessed, network information of a second network prohibited to be accessed, information of a private communications service's application allowed to access a public communications network, and information of a first private communications networks application allowed to access the second network; where the second network includes at least one of the following: a second private communications network and a public communications network.

Optionally, the routing information of the upper-layer application includes at least one of the following: application information and route description information.

Optionally, the route description information includes at least one of the following:

network slice information of the private communications service, a data network name DNN of the private communications service, a session and service continuity SSC mode of the private communications service, a packet data network PDN type of the private communications service, a type of a communications network for priority access, a type of a communications network allowed to be accessed, a type of a communications network prohibited to be accessed, network information of a communications network prioritized to be accessed, network information of a communications network allowed to be accessed, network information of a communications network prohibited to be accessed, a type of a communications service prioritized to be accessed, a type of an allowed communications service, and a type of a prohibited communications service.

Optionally, the communications network type includes at least one of the following: a private communications network and a public communications network.

The terminal 1500 can implement the processes of the method embodiment corresponding to FIG. 2 in this disclosure, with the same beneficial effects achieved. To avoid repetition, details are not described herein again.

Figure 16:
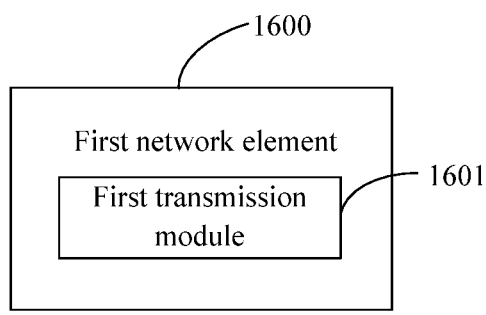
FIG. 16 is a structural diagram of a first network element according to an embodiment of this disclosure.

Referring to FIG. 16, FIG. 16 is a structural diagram of a first network element according to an embodiment of this disclosure. The first network element in this embodiment may include a RAN network element. As shown in FIG. 16, the first network element 1600 includes:

a first transmission module 1601, configured to send, to a first target end, at least one of information of a private communications network supported by the first network element, a private-communications-service-capability supported by the first network element, and redirection information of the private communications network, where the first target end includes at least one of a terminal and a core network CN network element.

Optionally, the information of the supported private communications network includes at least one of the following:

an identity of the supported private communications network, a frequency of the supported private communications network, and redirection frequency information of the supported private communications network.

The first network element 1600 can implement the processes of the method embodiment corresponding to FIG. 3 in this disclosure, with the same beneficial effects achieved. To avoid repetition, details are not described herein again.

Figure 17:
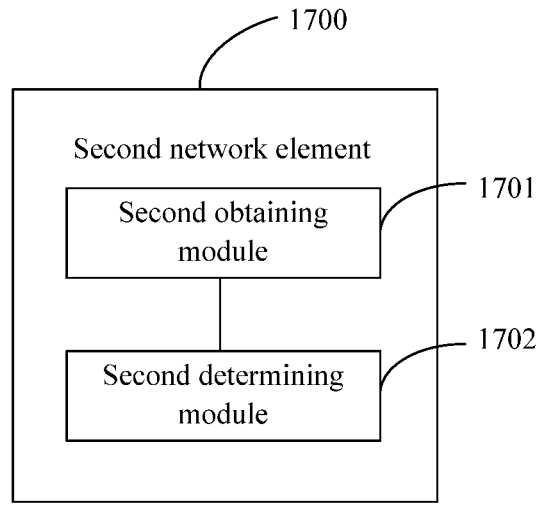
FIG. 17 is a structural diagram of a second network element according to an embodiment of this disclosure.

Referring to FIG. 17, FIG. 17 is a structural diagram of a second network element according to an embodiment of this disclosure. The second network element in this embodiment may include a RAN network element. As shown in FIG. 17, the second network element 1700 includes:

a second obtaining module 1701, configured to obtain second information, where the second information includes at least one of the following: a private communications service capability of a terminal, information of a private communications service that the terminal requests to access, information of a private communications network that the terminal requests to access, a private-communications-service-capability supported by a CN network element, information of a private communications network supported by the CN network element, information of a private communications service accessed by the terminal, information of a private communications network accessed by the terminal, a private-communications-service-capability supported by a RAN network element, and information of a private communications network supported by the RAN network element; and a second determining module 1702, configured to: based on the obtained second information, determine an operation of whether to allow the access of the terminal and/or determining an operation of selecting a CN network element.

Optionally, the second determining module 1702 is specifically configured to perform at least one of the following:

when the second network element does not support the private communications network and the terminal requests to access a type-B private communications network, prohibiting the access of the terminal;

when the second network element supports a first private communications network and the terminal requests to access the first private communications network, allowing the access of the terminal;

when the second network element supports the first private communications network and the terminal requests to access a type-A second private communications network, allowing the access of the terminal;

when the second network element supports the first private communications network, the terminal is allowed to roam to the first private communications network, and the terminal requests to access a type-A private communications network, allowing the access of the terminal;

when the second network element supports a first public communications network, the terminal is allowed to roam to the first public communications network, and the terminal requests to access a type-A private communications network, allowing the access of the terminal;

when the second network element supports the first private communications network, the terminal comes from a second private communications network, the terminal is allowed to roam to the first private communications network, and the terminal requests to access a type-A private communications network, allowing the access of the terminal; and when the second network element supports the first public communications network, the terminal comes from the first private communications network, the terminal is allowed to roam to the first public communications network, and the terminal requests to access a type-A private communications network, allowing the access of the terminal.

Optionally, the second determining module 1702 is specifically configured to perform at least one of the following:

selecting a CN network element supporting the private communications network that the terminal requests to access;

selecting a CN network element supporting the private communications service that the terminal requests to access;

when the terminal requests to access the first private communications network, selecting a CN network element that supports the first private communications network;

when the second network element supports the first private communications network and the terminal requests to access a type-A second private communications network, selecting a CN network element that supports the first private communications network;

when the second network element supports the first private communications network, the terminal is allowed to roam to the first private communications network, and the terminal requests to access a type-A private communications network, selecting a CN network element that supports the first private communications network;

when the second network element supports a first public communications network, the terminal is allowed to roam to the first public communications network, and the terminal requests to access a type-A private communications network, selecting a CN network element that supports the first public communications network;

when the second network element supports the first private communications network, the terminal comes from a second private communications network, the terminal is allowed to roam to the first private communications network, and the terminal requests to access a type-A private communications network, selecting a CN network element that supports the first private communications network; and when the second network element supports the first public communications network, the terminal comes from the first private communications network, the terminal is allowed to roam to the first public communications network, and the terminal requests to access a type-A private communications network, selecting a CN network element that supports the first public communications network.

The second network element 1700 can implement the processes of the method embodiment corresponding to FIG. 4 in this disclosure, with the same beneficial effects achieved. To avoid repetition, details are not described herein again.

Figure 18:
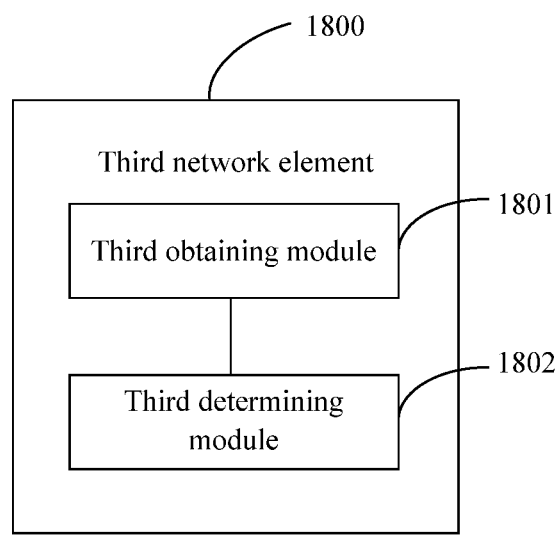
FIG. 18 is a structural diagram of a third network element according to an embodiment of this disclosure.

Referring to FIG. 18, FIG. 18 is a structural diagram of a third network element according to an embodiment of this disclosure. The network element in this embodiment is a CN network element. As shown in FIG. 18, the third network element 1800 includes:

a third obtaining module 1801, configured to obtain third information, where the third information includes at least one of the following: a private communications service capability of a terminal, information of a private communications service requested by the terminal, information of a private communications network that the terminal requests to access, private communications service subscription information of the terminal, a private-communications-service-capability supported by a RAN network element, information of a private communications network supported by the RAN network element, a private-communications-service-capability supported by a CN network element, and information of a private communications network supported by the CN network element; and a third determining module 1802, configured to determine first information based on the obtained third information, where the first information includes at least one of the following: information of the private communications service, mobility control information, and routing information of an upper-layer application.

Optionally, the third network element 1800 further includes:

a second transmission module, configured to send the first information to the second target end after the first information is determined based on the obtained third information, where the second target end includes at least one of the terminal and the RAN network element.

The third network element 1800 can implement the processes of the method embodiment corresponding to FIG. 5 in this disclosure, with the same beneficial effects achieved. To avoid repetition, details are not described herein again.

Figure 19:
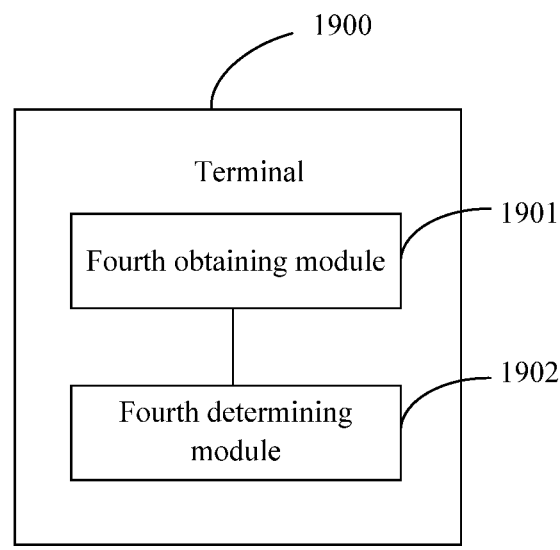
FIG. 19 is a structural diagram 2 of a terminal according to an embodiment of this disclosure.

Referring to FIG. 19, FIG. 19 is a structural diagram 2 of a terminal according to an embodiment of this disclosure. As shown in FIG. 19, the terminal 1900 includes:

a fourth obtaining module 1901, configured to obtain fourth information, where the fourth information includes at least one of the following: mobility control information, information of a private communications service accessed by a terminal, information of a first private communications network accessed by the terminal, a private-communications-service-capability supported by a network element, and information of a private communications network supported by the network element; and a fourth determining module 1902, configured to determine a network mobility operation based on the fourth information.

Optionally, the network mobility operation includes at least one of the following: a mobility operation within the first private communications network and a mobility operation between the first private communications network and a second network.

The second network includes at least one of the following: a second private communications network and a public communications network.

Optionally, the fourth determining module 1902 is specifically configured to perform at least one of the following:

determining whether to access a second network, sending first mobility information to the second network, and prohibiting a roaming-related operation.

Optionally, the fourth determining module 1902 is specifically configured to perform at least one of the following:

when access to the second network is allowed, accessing the second network;

when moving out of the first private communications network, accessing the second network based on network information of the second network allowed to be access; and when access to the second network is prohibited, prohibiting access to the second network.

Optionally, the prohibiting a roaming-related operation includes at least one of the following: releasing a context of the terminal, suspending a PDU session, and releasing a user-plane connection of the PDU session.

The terminal 1900 can implement the processes of the method embodiment corresponding to FIG. 6 in this disclosure, with the same beneficial effects achieved. To avoid repetition, details are not described herein again.

Figure 20:
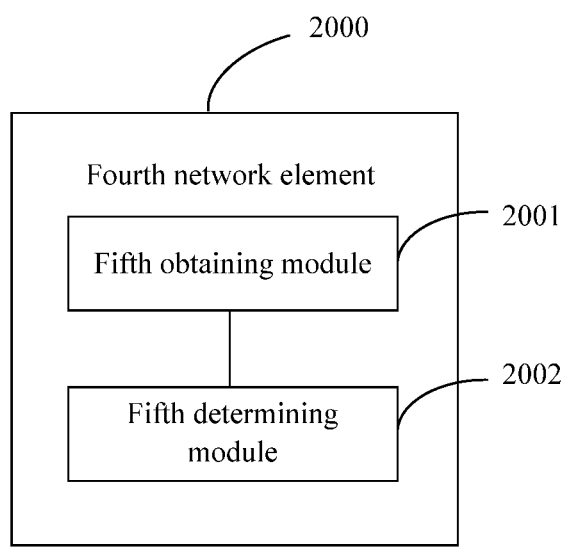
FIG. 20 is a structural diagram of a fourth network element according to an embodiment of this disclosure.

Referring to FIG. 20, FIG. 20 is a structural diagram of a fourth network element according to an embodiment of this disclosure. The fourth network element in this embodiment may include at least one of the following: a RAN network element, an AMF, or an SMF. As shown in FIG. 20, the fourth network element 2000 includes:

a fifth obtaining module 2001, configured to obtain fourth information, where the fourth information includes at least one of the following: information of a private communications service accessed by a terminal, information of a first private communications network accessed by the terminal, mobility control information, a private-communications-service-capability supported by a sixth network element, and information of a private communications network supported by the sixth network element; and a fifth determining module 2002, configured to determine a network mobility operation of the terminal based on the fourth information.

Optionally, the network mobility operation includes at least one of the following: a mobility operation within the first private communications network and a mobility operation between the first private communications network and a second network.

The second network includes at least one of the following: a second private communications network and a public communications network.

Optionally, the fifth determining module 2002 is specifically configured to perform at least one of the following:

selecting a target network element, sending the fourth information to the target network element, switching the terminal to the target network element, sending first mobility information, and prohibiting a roaming-related operation.

The target network element includes at least one of the following: a target RAN network element, a target CN network element, and a target AMF.

Optionally, when the terminal moves within the first private communications network or moves from a second network to the first private communications network, for the selecting a target network element, the fifth determining module 2002 is specifically configured to perform at least one of the following:

selecting, as the target network element, the sixth network element that supports the private communications network accessed by the terminal;

when the sixth network element supports the first private communications network and the terminal accesses the first private communications network, selecting, as the target network element, the sixth network element that supports the first private communications network;

selecting, as the target network element, the sixth network element that supports the private communications service accessed by the terminal;

when the sixth network element supports a first private communications service and the terminal accesses the first private communications service, selecting, as the target network element, the sixth network element that supports the first private communications service; and when the sixth network element does not support the private communications network accessed by the terminal, selecting a target network element of an access-allowing second network based on the mobility control information.

Optionally, when the terminal moves out of the first private communications network, the fifth determining module 2002 is specifically configured to perform at least one of the following:

when access to a second network is allowed, selecting, as the target network element, the sixth network element that supports the second network; and when access to the second network is allowed, initiating an operation of switching the terminal to the second network.

Optionally, when the terminal moves between the private communications network and the public communications network or the terminal moves between the first private communications network and the second network, the fifth determining module 2002 is specifically configured to perform at least one of the following:

sending the first mobility information; and initiating a handover based on a first interface, where the first interface is a communications interface between a RAN network element and a CN network element.

The fourth network element 2000 can implement the processes of the method embodiment corresponding to FIG. 7 in this disclosure, with the same beneficial effects achieved. To avoid repetition, details are not described herein again.

Figure 21:
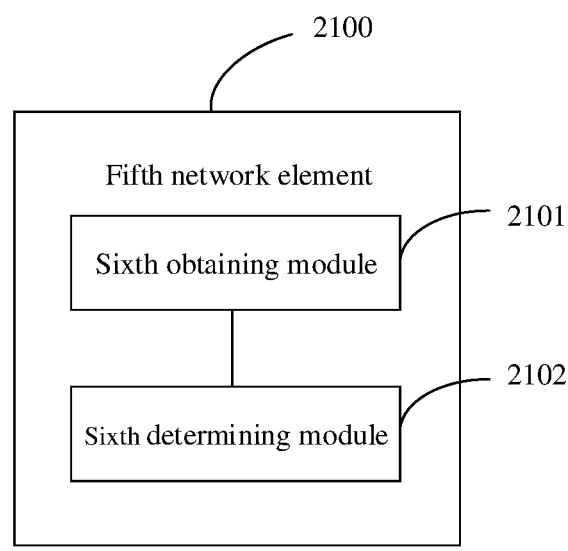
FIG. 21 is a structural diagram of a fifth network element according to an embodiment of this disclosure.

Referring to FIG. 21, FIG. 21 is a structural diagram of a fifth network element according to an embodiment of this disclosure. The network element in this embodiment is a CN network element. As shown in FIG. 21, the fifth network element 2100 includes:

a sixth obtaining module 2101, configured to obtain fifth information, where the fifth information includes at least one of the following: a private communications network that a terminal requests to access, a private communications service capability of the terminal, private communications service subscription information of the terminal, a private-communications-service-capability supported by a RAN network element, information of a private communications network supported by the RAN network element, a private-communications-service-capability supported by a CN network element, and information of a private communications network supported by the CN network element; and a sixth determining module 2102, configured to determine fourth information based on the obtained fifth information, where the fourth information includes at least one of the following: mobility control information, information of a private communications service accessed by the terminal, information of a first private communications network accessed by the terminal, a private-communications-service-capability supported by a sixth network element, and information of a private communications network supported by the sixth network element.

Optionally, the CN network element further includes:

a third transmission module, configured to send the fourth information to the second target end after the fourth information is determined based on the obtained fifth information, where the second target end includes at least one of the following: the terminal and the RAN network element.

The fifth network element 2100 can implement the processes of the method embodiment corresponding to FIG. 8 in this disclosure, with the same beneficial effects achieved. To avoid repetition, details are not described herein again.

Figure 22:
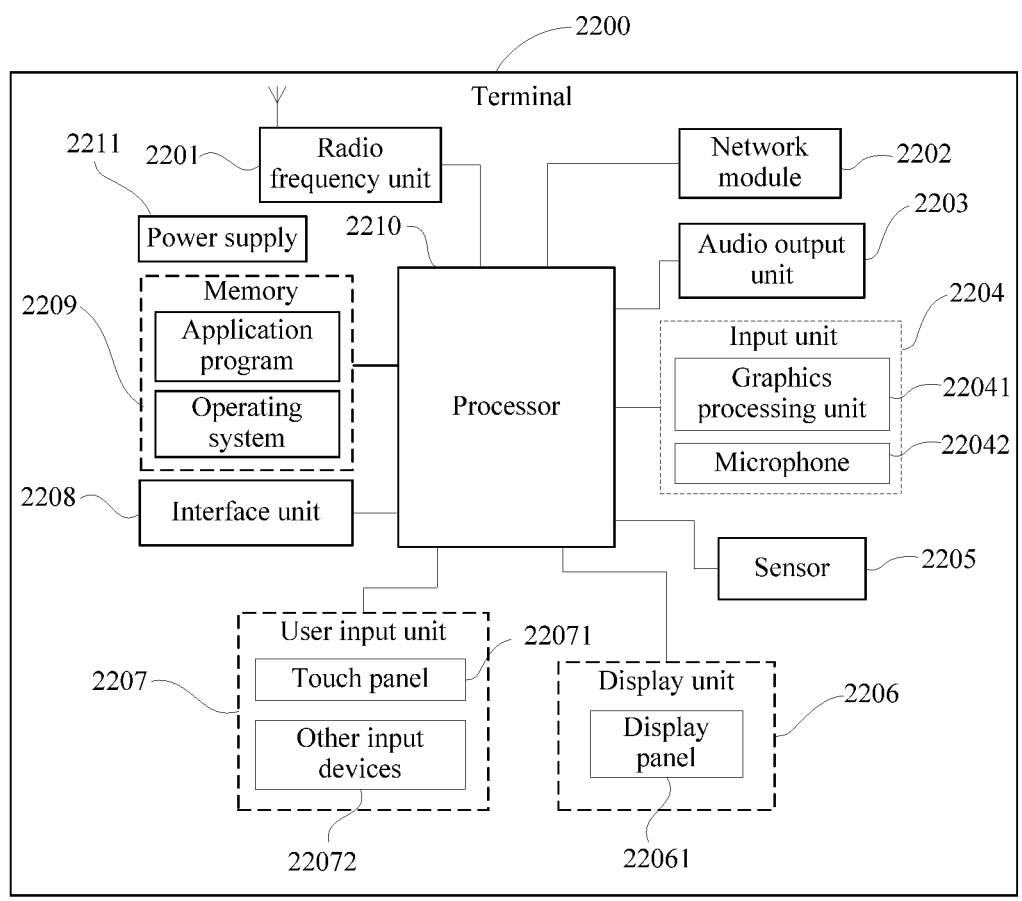
FIG. 22 is a structural diagram 3 of a terminal according to an embodiment of this disclosure.

Referring to FIG. 22, FIG. 22 is a structural diagram 3 of a terminal according to an embodiment of this disclosure. The terminal may be a schematic diagram of a hardware structure of a terminal that implements various embodiments of this disclosure. As shown in FIG. 22, the terminal 2200 includes but is not limited to components such as a radio frequency unit 2201, a network module 2202, an audio output unit 2203, an input unit 2204, a sensor 2205, a display unit 2206, a user input unit 2207, an interface unit 2208, a memory 2209, a processor 2210, and a power supply 2211. Persons skilled in the art can understand that a structure of the terminal shown in FIG. 22 does not constitute a limitation on the terminal, and the terminal may include more or fewer components than those shown in the figure, or a combination of some of the components, or a different arrangement of the components. In this embodiment of this disclosure, the terminal includes but is not limited to a mobile phone, a tablet computer, a laptop computer, a palmtop computer, an in-vehicle terminal, a wearable device, a pedometer, and the like.

The processor 2210 is configured to obtain first information, where the first information includes at least one of the following: information of a private communications service, mobility control information, and routing information of an upper-layer application; and determine a network access operation based on the first information.

Optionally, the processor 2210 is further configured to: determine a type of a communications network to access, select a communications network to access, and determine a manner of accessing a first network.

The first network is a network that supports the private communications service.

Optionally, the processor 2210 is further configured to: determine, based on an allowed communications network type for the upper-layer application, to access a private communications network or to access a public communications network; and select a communications network to access based on a private communications network supported by a network.

The radio frequency unit 2201 is configured to send, to the first network, at least one of a private-communications-service-capability supported by the terminal and information of a private communications network that the terminal requests to access.

Optionally, the information of the private communications service includes at least one of the following:

indication information of the private communications service, information of an operator network that supports the private communications network, information of the private communications network, information about an allowed area range for the private communications service, information about a prohibited area range for the private communications service, application information of an upper-layer application that allows the private communications service, and application information of an upper-layer application that prohibits the private communications service.

Optionally, the information of the private communications network includes at least one of the following: a PLMN identity, an identity of the private communications network, and a type of the private communications network.

Optionally, the type of the private communications network includes at least one of the following: type A and type B.

Optionally, the mobility control information may include at least one of the following:

whether access to a second network is allowed, network information of a second network allowed to be accessed, network information of a second network prohibited to be accessed, information of a private communications service's application allowed to access a public communications network, and information of a first private communications networks application allowed to access the second network; where The second network includes at least one of the following: a second private communications network and a public communications network.

Optionally, the routing information of the upper-layer application includes at least one of the following: application information and route description information.

Optionally, the route description information includes at least one of the following:

network slice information of the private communications service, a data network name DNN of the private communications service, a session and service continuity SSC mode of the private communications service, a packet data network PDN type of the private communications service, a type of a communications network for priority access, a type of a communications network allowed to be accessed, a type of a communications network prohibited to be accessed, network information of a communications network prioritized to be accessed, network information of a communications network allowed to be accessed, network information of a communications network prohibited to be accessed, a type of a communications service prioritized to be accessed, a type of an allowed communications service, and a type of a prohibited communications service.

Optionally, the communications network type includes at least one of the following: a private communications network and a public communications network.

The processor 2210 is configured to:

obtain fourth information, where the fourth information includes at least one of the following: mobility control information, information of a private communications service accessed by a terminal, information of a first private communications network accessed by the terminal, a private-communications-service-capability supported by a network element, and information of a private communications network supported by the network element; and determine a network mobility operation based on the fourth information.

Optionally, the network mobility operation includes at least one of the following: a mobility operation within the first private communications network and a mobility operation between the first private communications network and a second network.

The second network includes at least one of the following: a second private communications network and a public communications network.

Optionally, the processor 2210 is further configured to perform at least one of the following:

determining whether to access a second network, sending first mobility information to the second network, and prohibiting a roaming-related operation.

Optionally, the processor 2210 is further configured to perform at least one of the following:

when access to the second network is allowed, accessing the second network;

when moving out of the first private communications network, accessing the second network based on network information of the second network allowed to be access; and when access to the second network is prohibited, prohibiting access to the second network.

Optionally, the prohibiting a roaming-related operation includes at least one of the following: releasing a context of the terminal, suspending a PDU session, and releasing a user-plane connection of the PDU session.

It should be noted that the terminal 2200 in this embodiment can implement the processes of the method embodiments in the embodiments of this disclosure, with the same beneficial effects achieved. To avoid repetition, details are not described herein again.

It should be understood that in an embodiment of this disclosure, the radio frequency unit 2201 may be configured to: receive and send signals in an information receiving/sending process or a call process; and specifically, after receiving downlink data from a base station, send the downlink information to the processor 2210 for processing, and in addition, send uplink data to the base station. Generally, the radio frequency unit 2201 includes but is not limited to an antenna, at least one amplifier, a transceiver, a coupler, a low noise amplifier, a duplexer, and the like. In addition, the radio frequency unit 2201 may further communicate with a network and another device through a wireless communications system.

The terminal provides a user with wireless broadband internet access through the network module 2202, for example, helping the user to send or receive an e-mail, to browse a web page, or to access streaming media.

The audio output unit 2203 may convert audio data received by the radio frequency unit 2201 or the network module 2202 or stored in the memory 2209 into an audio signal and output the audio signal as a sound. Furthermore, the audio output unit 2203 may also provide audio output (for example, a call signal received sound or a message received sound) related to a specific function performed by the terminal 2200. The audio output unit 2203 includes a speaker, a buzzer, a receiver, and the like.

The input unit 2204 is configured to receive an audio or video signal. The input unit 2204 may include a graphics processing unit (Graphics Processing Unit, GPU) 22041 and a microphone 22042, and the graphics processing unit 22041 processes image data of a still picture or a video obtained by an image capture apparatus (for example, a camera) in an image capture mode or a video capture mode. A processed image frame may be displayed on the display unit 2206. An image frame processed by the graphics processing unit 22041 may be stored in the memory 2209 (or another storage medium) or sent by the radio frequency unit 2201 or the network module 2202. The microphone 22042 can receive a sound and can process the sound into audio data. The processed audio data can be converted into a format that can be sent to a mobile communication base station through the radio frequency unit 2201 in a telephone call mode, for outputting.

The terminal 2200 may further include at least one sensor 2205, for example, an optical sensor, a motion sensor, and other sensors. Specifically, the optical sensor includes an ambient light sensor and a proximity sensor, where the ambient light sensor can adjust luminance of a display panel 22061 based on brightness of ambient light, and the proximity sensor can turn off the display panel 22061 and/or backlight when the terminal 2200 is moved to an ear. As a type of motion sensor, an accelerometer sensor can detect magnitudes of accelerations in all directions (usually three axes), can detect a magnitude and a direction of gravity when the mobile phone is in a static state, and can be applied to terminal posture recognition (such as screen switching between portrait and landscape, related games, and magnetometer posture calibration), functions related to vibration recognition (such as pedometer and tapping), and the like. The sensor 2205 may also include a fingerprint sensor, a pressure sensor, an iris sensor, a molecular sensor, a gyroscope, a barometer, a hygrometer, a thermometer, an infrared sensor, and the like. Details are not described herein.

The display unit 2206 is configured to display information input by the user or information provided for the user. The display unit 2206 may include a display panel 22061, and the display panel 22061 may be configured in a form of a liquid crystal display (Liquid Crystal Display, LCD), an organic light-emitting diode (Organic Light-Emitting Diode, OLED), or the like.

The user input unit 2207 may be configured to receive input digital or character information and generate key signal input related to user setting and function control of the terminal. Specifically, the user input unit 2207 may include a touch panel 22071 and other input devices 22072. The touch panel 22071, also referred to as a touchscreen, may capture a touch operation performed by a user on or near the touch panel (for example, an operation performed by the user on the touch panel 22071 or near the touch panel 22071 by using any appropriate object or accessory such as a finger or a stylus). The touch panel 22071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 2210, and receives and executes a command sent by the processor 2210. In addition, the touch panel 22071 may be implemented in a plurality of forms, for example, as a resistive, capacitive, infrared, or surface acoustic wave touch panel. In addition to the touch panel 22071, the user input unit 2207 may further include other input devices 22072. Specifically, the other input devices 22072 may include but are not limited to a physical keyboard, a function key (such as a volume control key or a power on/off key), a trackball, a mouse, and a joystick. Details are not described herein.

Further, the touch panel 22071 may cover the display panel 22061. After detecting a touch operation on or near the touch panel 22071, the touch panel 22071 transmits information about the touch operation to the processor 2210 for the processor 2210 to determine a touch event type, and then the processor 2210 provides a corresponding visual output on the display panel 22061 based on the touch event type. Although in FIG. 22, the touch panel 22071 and the display panel 22061 act as two independent parts to implement input and output functions of the terminal, in some embodiments, the touch panel 22071 and the display panel 22061 may be integrated to implement the input and output functions of the terminal. This is not specifically limited herein.

The interface unit 2208 is an interface connecting an external apparatus to the terminal 2200. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 2208 may be configured to: receive input (for example, data information and power) from the external apparatus, and transmit the received input to one or more elements in the terminal 2200, or may be configured to transmit data between the terminal 2200 and the external apparatus.

The memory 2209 may be configured to store a software program and various data. The memory 2209 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 2209 may include a high-speed random access memory, and may further include a non-volatile memory, for example, at least one magnetic disk storage device, a flash memory device, or other non-volatile solid-state storage devices.

The processor 2210 is a control center of the terminal, and is configured to: connect various parts of the entire terminal by using various interfaces or lines, and perform various functions of the terminal and process data by running or executing software programs and/or modules stored in the memory 2209 and calling data stored in the memory 2209, so as to perform overall monitoring on the terminal. The processor 2210 may include one or more processing units. Optionally, an application processor and a modem processor may be integrated into the processor 2210. The application processor mainly processes an operating system, a user interface, an application program, and the like. The modem processor mainly processes wireless communication. It can be understood that the modem processor may alternatively not be integrated in the processor 2210.

The terminal 2200 may further include the power supply 2211 (for example, a battery) supplying power to all components. Optionally, the power supply 2211 may be logically connected to the processor 2210 through a power management system. In this way, functions such as charge management, discharge management, and power consumption management are implemented by using the power management system.

In addition, the terminal 2200 includes some functional modules that are not shown, details of which are not described herein.

Optionally, an embodiment of this disclosure further provides a terminal, including a processor 2210, a memory 2209, a computer program stored in the memory 2209 and capable of running on the processor 2210. When the computer program is executed by the processor 2210, the processes of the foregoing processing method embodiment are implemented, with the same technical effect achieved. To avoid repetition, details are not described herein again.

Figure 23:
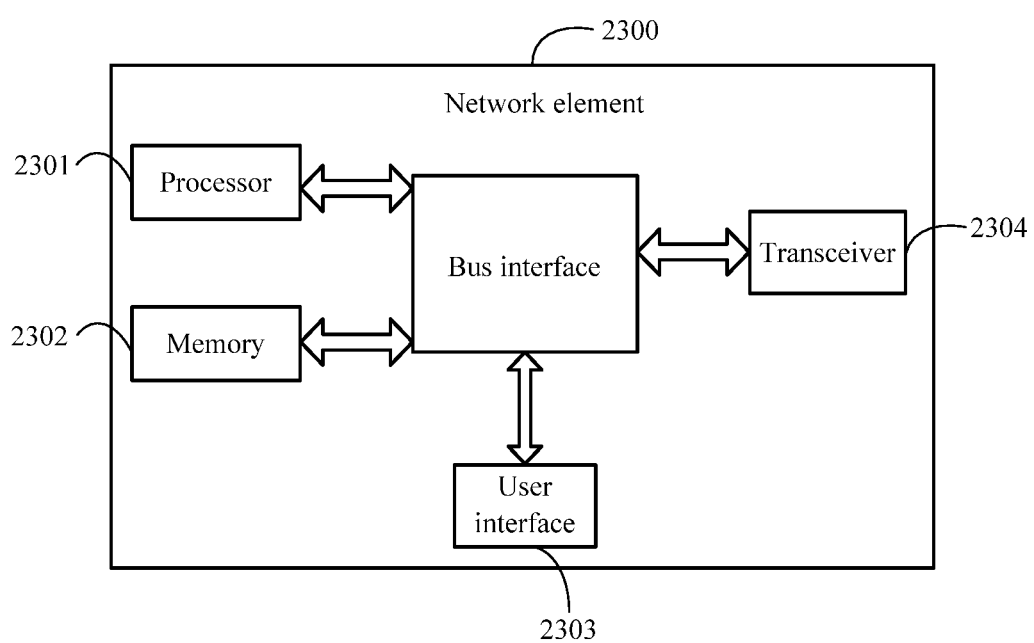
FIG. 23 is a structural diagram of a network element according to an embodiment of this disclosure.

Referring to FIG. 23, FIG. 23 is a structural diagram of a network element according to an embodiment of this disclosure. As shown in FIG. 23, the network element 2300 includes: a processor 2301, a memory 2302, a user interface 2303, a transceiver 2304, and a bus interface.

In this embodiment of this disclosure, the network element 2300 further includes: a computer program stored on the memory 2302 and capable of running on the processor 2301.

Scenario 1: The network element 2300 is embodied as the first network element in the foregoing method embodiment.

When the computer program is executed by the processor 2301, the following step is implemented:

sending, to a first target end, at least one of information of a private communications network supported by the first network element, a private-communications-service-capability supported by the first network element, and redirection information of the private communications network.

The first target end includes at least one of a terminal and a core network CN network element.

Optionally, the information of the supported private communications network includes at least one of the following:

an identity of the supported private communications network, a frequency of the supported private communications network, and redirection frequency information of the supported private communications network.

Scenario 2: The network element 2300 is embodied as the second network element in the foregoing method embodiment.

When the computer program is executed by the processor 2301, the following steps are implemented:

obtaining second information, where the second information includes at least one of the following: a private communications service capability of a terminal, information of a private communications service that the terminal requests to access, information of a private communications network that the terminal requests to access, a private-communications-service-capability supported by a CN network element, information of a private communications network supported by the CN network element, information of a private communications service accessed by the terminal, information of a private communications network accessed by the terminal, a private-communications-service-capability supported by a RAN network element, and information of a private communications network supported by the RAN network element; and based on the obtained second information, determining an operation of whether to allow the access of the terminal and/or determining an operation of selecting a CN network element.

Optionally, when the computer program is executed by the processor 2301, the following steps may be further implemented:

when the second network element does not support the private communications network and the terminal requests to access a type-B private communications network, prohibiting the access of the terminal;

when the second network element supports a first private communications network and the terminal requests to access the first private communications network, allowing the access of the terminal;

when the second network element supports the first private communications network and the terminal requests to access a type-A second private communications network, allowing the access of the terminal;

when the second network element supports the first private communications network, the terminal is allowed to roam to the first private communications network, and the terminal requests to access a type-A private communications network, allowing the access of the terminal;

when the second network element supports a first public communications network, the terminal is allowed to roam to the first public communications network, and the terminal requests to access a type-A private communications network, allowing the access of the terminal;

when the second network element supports the first private communications network, the terminal comes from a second private communications network, the terminal is allowed to roam to the first private communications network, and the terminal requests to access a type-A private communications network, allowing the access of the terminal; and when the second network element supports the first public communications network, the terminal comes from the first private communications network, the terminal is allowed to roam to the first public communications network, and the terminal requests to access a type-A private communications network, allowing the access of the terminal.

Optionally, when the computer program is executed by the processor 2301, the following steps may be further implemented:

selecting a CN network element supporting the private communications network that the terminal requests to access;

selecting a CN network element supporting the private communications service that the terminal requests to access;

when the terminal requests to access the first private communications network, selecting a CN network element that supports the first private communications network;

when the second network element supports the first private communications network and the terminal requests to access a type-A second private communications network, selecting a CN network element that supports the first private communications network;

when the second network element supports the first private communications network, the terminal is allowed to roam to the first private communications network, and the terminal requests to access a type-A private communications network, selecting a CN network element that supports the first private communications network;

when the second network element supports a first public communications network, the terminal is allowed to roam to the first public communications network, and the terminal requests to access a type-A private communications network, selecting a CN network element that supports the first public communications network;

when the second network element supports the first private communications network, the terminal comes from a second private communications network, the terminal is allowed to roam to the first private communications network, and the terminal requests to access a type-A private communications network, selecting a CN network element that supports the first private communications network; and when the second network element supports the first public communications network, the terminal comes from the first private communications network, the terminal is allowed to roam to the first public communications network, and the terminal requests to access a type-A private communications network, selecting a CN network element that supports the first public communications network.

Scenario 3: The network element 2300 is embodied as the third network element in the foregoing method embodiment.

When the computer program is executed by the processor 2301, the following steps are implemented:

obtaining third information, where the third information includes at least one of the following: a private communications service capability of a terminal, information of a private communications service requested by the terminal, information of a private communications network that the terminal requests to access, private communications service subscription information of the terminal, a private-communications-service-capability supported by a RAN network element, information of a private communications network supported by the RAN network element, a private-communications-service-capability supported by a CN network element, and information of a private communications network supported by the CN network element; and determining first information based on the obtained third information, where the first information includes at least one of the following: information of the private communications service, mobility control information, and routing information of an upper-layer application.

Optionally, when the computer program is executed by the processor 2301, the following step may be further implemented:

sending the first information to a second target end, where the second target end may include at least one of the terminal and the RAN network element.

Scenario 4: The network element 2300 is embodied as the fourth network element in the foregoing method embodiment.

When the computer program is executed by the processor 2301, the following steps are implemented:

obtaining fourth information, where the fourth information includes information of a private communications service accessed by a terminal, information of a first private communications network accessed by the terminal, mobility control information, a private-communications-service-capability supported by a sixth network element, and information of a private communications network supported by the sixth network element; and determining a network mobility operation of the terminal based on the fourth information.

Optionally, the network mobility operation includes at least one of the following: a mobility operation within the first private communications network and a mobility operation between the first private communications network and a second network.

The second network includes at least one of the following: a second private communications network and a public communications network.

Optionally, when the computer program is executed by the processor 2301, at least one of the following steps may be further implemented:

selecting a target network element, sending the fourth information to the target network element, switching the terminal to the target network element, sending first mobility information, and prohibiting a roaming-related operation.

The target network element includes at least one of the following: a target RAN network element, a target CN network element, and a target AMF.

Optionally, when the terminal moves within the first private communications network or moves from the second network to the first private communications network, and when the computer program is executed by the processor 2301, at least one of the following steps may be further implemented:

selecting, as the target network element, the sixth network element that supports the private communications network accessed by the terminal;

when the sixth network element supports the first private communications network and the terminal accesses the first private communications network, selecting, as the target network element, the sixth network element that supports the first private communications network;

selecting, as the target network element, the sixth network element that supports the private communications service accessed by the terminal;

when the sixth network element supports a first private communications service and the terminal accesses the first private communications service, selecting, as the target network element, the sixth network element that supports the first private communications service; and when the sixth network element does not support the private communications network accessed by the terminal, selecting a target network element of an access-allowing second network based on the mobility control information.

Optionally, when the terminal moves out of the first private communications network, for the operation of selecting the target network element, at least one of the following steps may be further implemented when the computer program is executed by the processor 2301:

when access to a second network is allowed, selecting, as the target network element, the sixth network element that supports the second network; and when access to the second network is allowed, initiating an operation of switching the terminal to the second network.

Optionally, when the terminal moves between the first private communications network and the second network, and when the computer program is executed by the processor 2301, at least one of the following steps may be further implemented:

sending the first mobility information; and initiating a handover based on a first interface, where the first interface is a communications interface between a RAN network element and a CN network element.

Scenario 5: The network element 2300 is embodied as the fifth network element in the foregoing method embodiment.

When the computer program is executed by the processor 2301, the following steps are implemented:

obtaining fifth information, where the fifth information includes at least one of the following: a private communications network that a terminal requests to access, a private communications service capability of the terminal, private communications service subscription information of the terminal, a private-communications-service-capability supported by a RAN network element, information of a private communications network supported by the RAN network element, a private-communications-service-capability supported by a CN network element, and information of a private communications network supported by the CN network element; and determining fourth information based on the obtained fifth information, where the fourth information includes at least one of the following: mobility control information, information of a private communications service accessed by the terminal, information of a first private communications network accessed by the terminal, a private-communications-service-capability supported by a sixth network element, and information of a private communications network supported by the sixth network element.

Optionally, when the computer program is executed by the processor 2301, the following steps may be further implemented:

sending the fourth information to a second target end, where the second target end includes at least one of the following: the terminal and the RAN network element.

In FIG. 23, a bus architecture may include any quantity of interconnected buses and bridges, specifically for interconnecting various circuits of one or more processors represented by the processor 2301 and a memory represented by the memory 2302. The bus architecture may further interconnect various other circuits such as a peripheral device, a voltage regulator, and a power management circuit. These are all well known in the art, and therefore are not further described in this specification. The bus interface provides an interface. The transceiver 2304 may be a plurality of components, that is, the transceiver 2304 includes a transmitter and a receiver, and provides a unit for communicating with various other apparatuses on a transmission medium. For different user equipments, the user interface 2303 may also be an interface that can be externally or internally connected to a required device. The connected device includes but is not limited to a keypad, a display, a speaker, a microphone, a joystick, and the like.

The processor 2301 is responsible for bus architecture management and general processing. The memory 2302 may store data used when the processor 2301 performs an operation.

The network element 2300 can implement the processes implemented by the network element in the method embodiment corresponding to FIG. 2, FIG. 3, FIG. 4, FIG. 6, or FIG. 7. To avoid repetition, details are not described herein again.

An embodiment of this disclosure further provides a computer-readable storage medium. The computer-readable storage medium stores a computer program, and when the computer program is executed by a processor, the processes of the method embodiment corresponding to FIG. 1, FIG. 2, FIG. 3, FIG. 4, FIG. 5, FIG. 6, or FIG. 7 are implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to related technologies may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A processing method, performed by a terminal and comprising:
   obtaining first information, wherein the first information comprises information of a first private communications network accessed by the terminal;
   wherein the terminal of the first private communications network is not allowed to access or roam to a second network; and
   determining a network mobility operation based on the first information;
   wherein determining the network mobility operation based on the first information comprises at least one of the following:
   prohibiting roaming to the second network in response to determining that the terminal has accessed the first private communications network and has moved out of the first private communications network; or
   prohibiting access to the second network in response to determining that the terminal has accessed the first private communications network and has moved out of the first private communications network;
   wherein the second network comprises at least one of the following: a second private communications network or a public communications network; wherein the second private communications network is different from the first private communications network.

2. The method according to claim 1, wherein the network mobility operation further comprises at least one of the following: a mobility operation within the first private communications network or a mobility operation between the first private communications network and a second network.

3. The method according to claim 1, wherein the determining a network mobility operation comprises further at least one of the following:
   determining whether to access a second network, or sending first mobility information to the second network.

4. The method according to claim 3, wherein the determining whether to access a second network further comprises at least one of the following:
   when access to the second network is allowed, accessing the second network; or
   when moving out of the first private communications network, accessing the second network based on network information of the second network allowed to be access.

5. The method according to claim 1, wherein the prohibiting roaming to the second network comprises at least one of the following: releasing a context of the terminal, suspending a PDU session, or releasing a user-plane connection of the PDU session.

6. A terminal, comprising a processor, a memory, and a computer program stored in the memory and capable of running on the processor, wherein the computer program is executed by the processor to implement:
   obtaining first information, wherein the first information comprises information of a first private communications network accessed by the terminal; wherein the terminal of the first private communications network is not allowed to access or roam to a second network; and
   determining a network mobility operation based on the first information;
   wherein determining the network mobility operation based on the first information comprises at least one of the following:
   prohibiting roaming to the second network in response to determining that the terminal has accessed the first private communications network and has moved out of the first private communications network; or
   prohibiting access to the second network in response to determining that the terminal has accessed the first private communications network and has moved out of the first private communications network;
   wherein the second network comprises at least one of the following: a second private communications network or a public communications network; wherein the second private communications network is different from the first private communications network.

7. A non-transitory computer-readable storage medium, storing a computer program, wherein the computer program, when executed by a processor, implements:
   obtaining first information, wherein the first information comprises information of a first private communications network accessed by the terminal; wherein the terminal of the first private communications network is not allowed to access or roam to a second network; and
   determining a network mobility operation based on the first information;

wherein determining the network mobility operation based on the first information comprises at least one of the following:

prohibiting roaming to the second network in response to determining that the terminal has accessed the first private communications network and has moved out of the first private communications network; or prohibiting access to the second network in response to determining that the terminal has accessed the first private communications network and has moved out of the first private communications network;

wherein the second network comprises at least one of the following: a second private communications network or a public communications network; wherein the second private communications network is different from the first private communications network.

8. The terminal according to claim 6, wherein the network mobility operation further comprises at least one of the following: a mobility operation within the first private communications network or a mobility operation between the first private communications network and a second network.

9. The terminal according to claim 6, wherein the determining a network mobility operation comprises further at least one of the following:

determining whether to access a second network, or sending first mobility information to the second network.

10. The terminal according to claim 9, wherein the determining whether to access a second network further comprises at least one of the following:

when access to the second network is allowed, accessing the second network; or when moving out of the first private communications network, accessing the second network based on network information of the second network allowed to be access.

* * * * *